US007794317B2

(12) United States Patent
Kaminkow et al.

(10) Patent No.: US 7,794,317 B2
(45) Date of Patent: Sep. 14, 2010

(54) GAMING DEVICE HAVING AWARD GENERATION WITH MULTIPLE INDICATORS AND INDICATOR DETERMINATION DEVICE

(75) Inventors: Joseph E. Kaminkow, Reno, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 981 days.

(21) Appl. No.: 10/956,769

(22) Filed: Sep. 30, 2004

(65) Prior Publication Data

US 2005/0075159 A1 Apr. 7, 2005

Related U.S. Application Data

(63) Continuation-in-part of application No. 10/649,091, filed on Aug. 27, 2003, which is a continuation-in-part of application No. 10/243,459, filed on Sep. 12, 2002, now Pat. No. 7,431,649.

(51) Int. Cl.
*A63F 13/02* (2006.01)
*A63F 13/10* (2006.01)
*A63F 5/04* (2006.01)
*G07F 17/34* (2006.01)

(52) U.S. Cl. ........................................ 463/16; 463/20

(58) Field of Classification Search .............. 463/11–21
See application file for complete search history.

(56) References Cited

U.S. PATENT DOCUMENTS

| | | | |
|---|---|---|---|
| 2,743,108 | A | 4/1956 | Sanders |
| 3,904,207 | A | 9/1975 | Gold |
| 4,448,419 | A | 5/1984 | Telnaes |
| 4,560,161 | A | 12/1985 | Hamano |
| 4,695,053 | A | 9/1987 | Vazquez, Jr. et al. |
| 4,775,155 | A | 10/1988 | Lees |
| 5,116,055 | A | 5/1992 | Tracy |
| 5,205,555 | A | 4/1993 | Hamano |
| 5,342,047 | A | 8/1994 | Heidel et al. |
| 5,393,057 | A | 2/1995 | Marnell, II |

(Continued)

FOREIGN PATENT DOCUMENTS

| | | |
|---|---|---|
| DE | 8710757 | 11/1987 |

(Continued)

OTHER PUBLICATIONS

"American Bandstand Article" in Slot City Times published 2001.

(Continued)

*Primary Examiner*—Peter DungBa Vo
*Assistant Examiner*—Matthew D. Hoel
(74) *Attorney, Agent, or Firm*—K&L Gates LLP

(57) ABSTRACT

A gaming device including a wheel and multiple award indicators. The wheel includes a plurality of sections having awards associated with each of the sections. The section indicators associated with the wheel simultaneously indicate sections on the wheel. The number of activated section indicators is determined based on at least one award indicator activator symbol generator which is adapted to generate one of a plurality of award indicator activator symbols that are each associated with zero, one or more of the award indicators of the wheel. The awards associated with the sections indicated by the activated section indicators are summed and provided to a player.

39 Claims, 26 Drawing Sheets

U.S. PATENT DOCUMENTS

| | | | | |
|---|---|---|---|---|
| 5,407,200 | A | 4/1995 | Zalabah | |
| 5,411,271 | A | 5/1995 | Mirando | |
| 5,536,016 | A | 7/1996 | Thompson | |
| 5,542,669 | A | 8/1996 | Charron et al. | |
| 5,611,730 | A | 3/1997 | Weiss | |
| 5,639,089 | A | 6/1997 | Matsumoto et al. | |
| 5,641,730 | A | 6/1997 | Brown | |
| 5,645,486 | A | 7/1997 | Nagao et al. | |
| 5,647,798 | A | 7/1997 | Falciglia | |
| 5,755,619 | A | 5/1998 | Matsumoto et al. | |
| 5,769,716 | A | 6/1998 | Saffari et al. | |
| 5,788,573 | A | 8/1998 | Baerlocher et al. | |
| 5,823,873 | A | 10/1998 | Moody | |
| 5,823,874 | A * | 10/1998 | Adams | 463/17 |
| 5,833,537 | A | 11/1998 | Barrie | |
| 5,848,932 | A | 12/1998 | Adams | |
| 5,851,148 | A | 12/1998 | Brune et al. | |
| 5,882,261 | A * | 3/1999 | Adams | 463/20 |
| 5,890,962 | A | 4/1999 | Takemoto | |
| 5,893,718 | A | 4/1999 | O'Donnell | |
| 5,911,418 | A | 6/1999 | Adams | |
| 5,927,714 | A | 7/1999 | Kaplan | |
| 5,935,002 | A | 8/1999 | Falciglia | |
| 5,947,820 | A | 9/1999 | Morro et al. | |
| 5,976,016 | A | 11/1999 | Moody et al. | |
| 5,980,384 | A | 11/1999 | Barrie | |
| 5,997,401 | A | 12/1999 | Crawford | |
| 6,007,066 | A | 12/1999 | Moody | |
| 6,015,346 | A | 1/2000 | Bennett | |
| 6,019,369 | A | 2/2000 | Nakagawa et al. | |
| 6,056,642 | A | 5/2000 | Bennett | |
| 6,059,289 | A | 5/2000 | Vancura | |
| 6,059,658 | A | 5/2000 | Mangano et al. | |
| 6,089,976 | A | 7/2000 | Schneider et al. | |
| 6,089,978 | A | 7/2000 | Adams | |
| 6,093,102 | A | 7/2000 | Bennett | |
| 6,102,798 | A | 8/2000 | Bennett | |
| 6,120,377 | A | 9/2000 | McGinnis, Sr. et al. | |
| 6,126,542 | A | 10/2000 | Fier | |
| 6,126,547 | A | 10/2000 | Ishimoto | |
| 6,135,884 | A | 10/2000 | Hedrick et al. | |
| 6,142,873 | A | 11/2000 | Weiss et al. | |
| 6,149,156 | A | 11/2000 | Feola | |
| 6,159,095 | A | 12/2000 | Frohm et al. | |
| 6,159,096 | A | 12/2000 | Yoseloff | |
| 6,159,097 | A | 12/2000 | Gura | |
| 6,159,098 | A | 12/2000 | Slomiany et al. | |
| 6,162,121 | A | 12/2000 | Morro et al. | |
| 6,168,520 | B1 | 1/2001 | Baerlocher et al. | |
| 6,174,235 | B1 | 1/2001 | Walker et al. | |
| 6,186,894 | B1 * | 2/2001 | Mayeroff | 463/20 |
| 6,190,255 | B1 | 2/2001 | Thomas et al. | |
| 6,224,483 | B1 * | 5/2001 | Mayeroff | 463/20 |
| 6,231,442 | B1 | 5/2001 | Mayeroff | |
| 6,234,897 | B1 | 5/2001 | Frohm et al. | |
| 6,254,481 | B1 | 7/2001 | Jaffe | |
| 6,261,177 | B1 | 7/2001 | Bennett | |
| 6,270,412 | B1 | 8/2001 | Crawford et al. | |
| 6,309,300 | B1 | 10/2001 | Glavich | |
| 6,315,660 | B1 | 11/2001 | DeMar et al. | |
| 6,315,664 | B1 | 11/2001 | Baerlocher et al. | |
| 6,319,123 | B1 | 11/2001 | Paludi | |
| 6,319,124 | B1 | 11/2001 | Baerlocher et al. | |
| 6,322,309 | B1 | 11/2001 | Thomas et al. | |
| 6,334,814 | B1 | 1/2002 | Adams | |
| 6,336,863 | B1 | 1/2002 | Baerlocher et al. | |
| 6,338,678 | B1 | 1/2002 | Seelig et al. | |
| 6,346,043 | B1 | 2/2002 | Colin et al. | |
| 6,347,996 | B1 | 2/2002 | Gilmore et al. | |
| 6,364,766 | B1 | 4/2002 | Anderson et al. | |
| 6,364,767 | B1 | 4/2002 | Brossard et al. | |
| 6,375,187 | B1 | 4/2002 | Baerlocher et al. | |
| 6,398,644 | B1 | 6/2002 | Perrie et al. | |
| 6,428,412 | B1 | 8/2002 | Anderson et al. | |
| 6,439,995 | B1 | 8/2002 | Hughs-Baird et al. | |
| 6,443,837 | B1 | 9/2002 | Jaffe et al. | |
| 6,450,884 | B1 | 9/2002 | Seelig et al. | |
| 6,461,241 | B1 | 10/2002 | Webb et al. | |
| 6,464,582 | B1 | 10/2002 | Baerlocher et al. | |
| 6,481,713 | B2 | 11/2002 | Perrie et al. | |
| 6,482,089 | B2 | 11/2002 | Demar et al. | |
| 6,506,118 | B1 | 1/2003 | Baerlocher et al. | |
| 6,508,707 | B2 | 1/2003 | DeMar et al. | |
| 6,533,658 | B1 | 3/2003 | Walker et al. | |
| 6,533,660 | B2 | 3/2003 | Seelig et al. | |
| 6,547,242 | B1 | 4/2003 | Sugiyama et al. | |
| 6,561,904 | B2 | 5/2003 | Locke et al. | |
| 6,575,830 | B2 | 6/2003 | Baerlocher et al. | |
| 6,582,307 | B2 | 6/2003 | Webb | |
| 6,599,185 | B1 | 7/2003 | Kaminkow et al. | |
| 6,602,135 | B1 | 8/2003 | Gerrard | |
| 6,602,137 | B2 | 8/2003 | Kaminkow et al. | |
| 6,607,437 | B2 | 8/2003 | Casey et al. | |
| 6,612,927 | B1 * | 9/2003 | Slomiany et al. | 463/16 |
| 6,645,073 | B2 | 11/2003 | Lemay et al. | |
| 6,652,378 | B2 | 11/2003 | Cannon et al. | |
| 6,656,040 | B1 | 12/2003 | Brosnan et al. | |
| 6,656,043 | B2 | 12/2003 | Seelig et al. | |
| 6,682,419 | B2 | 1/2004 | Webb et al. | |
| 6,682,420 | B2 | 1/2004 | Webb et al. | |
| 6,869,357 | B2 * | 3/2005 | Adams et al. | 463/16 |
| 6,890,255 | B2 * | 5/2005 | Jarvis et al. | 463/17 |
| 7,011,581 | B2 * | 3/2006 | Cole et al. | 463/16 |
| 7,175,523 | B2 | 2/2007 | Gilmore et al. | |
| 2001/0054794 | A1 * | 12/2001 | Cole et al. | 273/138.1 |
| 2002/0004424 | A1 | 1/2002 | Nelson et al. | |
| 2002/0019255 | A1 | 2/2002 | Randall et al. | |
| 2002/0025846 | A1 | 2/2002 | Bennett et al. | |
| 2002/0025849 | A1 | 2/2002 | Olive | |
| 2002/0045472 | A1 | 4/2002 | Adams | |
| 2002/0055382 | A1 * | 5/2002 | Meyer | 463/20 |
| 2002/0065126 | A1 * | 5/2002 | Miller et al. | 463/20 |
| 2002/0094855 | A1 | 7/2002 | Berman | |
| 2002/0098884 | A1 * | 7/2002 | Adams | 463/20 |
| 2002/0142822 | A1 | 10/2002 | Baerlocher et al. | |
| 2002/0198036 | A1 | 12/2002 | Baerlocher et al. | |
| 2002/0198038 | A1 * | 12/2002 | Adams | 463/20 |
| 2003/0040360 | A1 | 2/2003 | Kaminkow | |
| 2003/0045348 | A1 | 3/2003 | Palmer et al. | |
| 2003/0045350 | A1 | 3/2003 | Baerlocher et al. | |
| 2003/0064772 | A1 | 4/2003 | Tempest et al. | |
| 2003/0064785 | A1 | 4/2003 | Stone et al. | |
| 2003/0069064 | A1 | 4/2003 | Ainsworth | |
| 2003/0083121 | A1 * | 5/2003 | Cole et al. | 463/16 |
| 2003/0119583 | A1 | 6/2003 | Kaminkow et al. | |
| 2003/0162584 | A1 | 8/2003 | Hughs-Baird et al. | |
| 2003/0195027 | A1 | 10/2003 | Baerlocher et al. | |
| 2003/0207709 | A1 | 11/2003 | Paotrakul | |
| 2003/0207710 | A1 | 11/2003 | Rodgers et al. | |
| 2004/0002372 | A1 | 1/2004 | Rodgers et al. | |
| 2004/0029631 | A1 | 2/2004 | Duhamel | |
| 2004/0053673 | A1 | 3/2004 | Mishra | |
| 2004/0053683 | A1 | 3/2004 | Hartl et al. | |
| 2004/0072619 | A1 | 4/2004 | Brosnan et al. | |
| 2004/0077398 | A1 * | 4/2004 | Jarvis et al. | |
| 2004/0152509 | A1 | 8/2004 | Hornik et al. | |

FOREIGN PATENT DOCUMENTS

| | | |
|---|---|---|
| DE | 19600787 | 5/1997 |
| DE | 19613455 | 8/1997 |
| DE | 19936196 | 1/2001 |
| EP | 0 449 433 | 10/1991 |
| EP | 0 874 337 | 10/1998 |

| | | | | |
|---|---|---|---|---|
| EP | 0 945 837 | | | 9/1999 |
| EP | 0 984 408 | | | 3/2000 |
| EP | 0 984 409 | | | 3/2000 |
| GB | 2 117 952 | | | 10/1983 |
| GB | 2 137 392 | A | | 10/1984 |
| GB | 2 170 636 | A | | 8/1986 |
| GB | 2 191 030 | | | 12/1987 |
| GB | 2 201 821 | | | 9/1988 |
| GB | 2 201 821 | A | * | 9/1988 |
| GB | 2322217 | | | 8/1998 |
| WO | WO 00/12186 | | | 3/2000 |

OTHER PUBLICATIONS

Anchor Games Unveils 'City of Slots', Anchor Games Slot City Times, Oct. 2001.
Austin Powers in Goldmember™ Advertisement written by IGT, published in 2003.
Bingo Game Brochure written by Casino Data System, published in 1998.
Fortune Cookie Brochure written by IGT, published in 2000.
Full House Brochure written by Anchor Games, published in 2000.
Jewel in the Crown Brochure written by Barcrest, Ltd, published date unknown.
Magic 8 Ball Advertisement written by IGT, published in 2002.
Match Reel Game Bonus Description written by IGT, published date unknown.
Monte Carlo Advertisement written by Bally Gaming, published prior to Sep. 12, 2002.
Plinko Showcase Show Down written by International Game Technology, published in 2001.
Slot Machines [In Part] written by Marshal Fey, published 1997.
Take Your Pick Brochure written by Anchor Games, published in 1999.
Top Dollar Brochure written by IGT, published in 1999.
Wheel & Deal Brochure written by Anchor Games, Strictly Slots, published in Dec. 2001.
Wheel of Fortune Advertisement written by IGT, published in 1998.
Wheel of Fortune Advertisement written by IGT, published in 1999.
Wheel Poker Brochure written by Anchor Games/Bally Gaming, Strictly Slots, prior to Sep. 12, 2002.

* cited by examiner

GAMING DEVICE HAVING AWARD GENERATION WITH MULTIPLE INDICATORS AND INDICATOR DETERMINATION DEVICE

PRIORITY CLAIM

This application is a continuation-in-part of and claims the benefit of U.S. patent application Ser. No. 10/649,091, filed Aug. 27, 2003, which is a continuation-in-part of and claims the benefit of U.S. patent application Ser. No. 10/243,459, filed Sep. 12, 2002, now U.S. Pat. No. 7,431,649 the entire contents of which are incorporated herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to a gaming device having multiple selectable indicators.

Gaming device manufacturers strive to make gaming devices that provide as much enjoyment and excitement as possible. Providing a secondary or bonus game in which a player has an opportunity to win potentially large awards or credits in addition to the awards associated with the primary or base game of the gaming device is one known method for enhancing player enjoyment and excitement.

Gaming devices having bonus games generally employ a triggering event that occurs during the operation of the base game of the gaming device. The triggering event temporarily stalls or halts the base game play and enables a player to enter a second, different game, which is the secondary or bonus game. The player plays the bonus game, likely receives an award, and returns to the base game.

Bonus games exist that employ a wheel including several awards. A player spins the wheel to obtain one or more awards on the wheel. One such bonus game is the "WHEEL OF FORTUNE" gaming device manufactured by the assignee of this application. In this game, a multi-colored award wheel is attached to a gaming device. The award wheel is divided into several sections. Each section includes an award that ranges in value from twenty-five to one thousand. In this game, a player plays a base game that includes spinning reels and a central payline. When the wheel symbol is positioned along the central payline on the third reel, the player enters the bonus game.

In the bonus game, the player obtains one opportunity or spin of the award wheel. The player spins the award wheel by pressing a button on the gaming device. Once the award wheel starts spinning, the player waits until it stops. An indicator located at the top of the award wheel points to a section of the wheel. The player receives the award on the indicated section for the bonus game. After the player receives that award, the bonus game ends and the player may resume playing the base game.

Another bonus game is disclosed in U.S. Pat. No. 6,224,483. U.S. Pat. No. 6,224,483 discloses a gaming device having a bonus game that initially displays a primary game including several reels with symbols to a player. Multiple paylines are associated with the reels. A bonus game is initiated when the player obtains a specific combination of symbols on the reels. In the bonus game, the player spins a wheel including several awards. The number of spins of the wheel provided to the player is based on the number of paylines that the player played in the primary game, the number of credits wagered on the paylines or a specific symbol combination or combinations on the reels in the primary game. The player spins the wheel in the bonus game and obtains a single award between twenty-five and one thousand credits in each spin. The bonus game ends when the player has no spins remaining. The player receives the total accumulated award from the bonus game.

Gaming devices that increase the opportunities to obtain awards and increase the size of the awards are desirable. Players are attracted to games that provide several larger awards and the opportunity to obtain a very large award. Therefore, to increase player enjoyment and excitement, it is desirable to provide new games for gaming devices.

SUMMARY OF THE INVENTION

The present invention is directed to a gaming device having a game with an award indicator and in one embodiment, a wheel or other display device with multiple selectable section indicators.

In one embodiment of the gaming device, the award indicator or wheel has a plurality of sections. Each section includes an award symbol which is associated with one or more awards. Also, the gaming device includes a plurality of activatable section indicators which are adapted to indicate sections on the wheel. In one embodiment, the wheel is a mechanical wheel that is attached to the gaming device and the processor of the gaming device causes the wheel to physically spin. In another embodiment, the wheel is in a video format on a video display device of the gaming device. In one embodiment of a game, a player receives only one spin of the wheel. The player spins the wheel (by activating an input) and receives the awards associated with the sections on the wheel which are simultaneously indicated by the activated section indicators. A total award display indicates the total award obtained by the player in the game.

In one embodiment, the number of activated section indicators is determined by the player's wager in the base game. In another embodiment, the number of activated section indicators is determined by picking one or more selections from a plurality of selections. Thus, in a game having three section indicators, a number one, a number two and a number three are associated with the selections. The player picks one of the selections provided by the gaming device from the plurality of selections to determine the number of section indicators that will be activated in the game. For example, if the player picks one selection and that selection reveals the number three, the gaming device activates all three section indicators in the game and thereby simultaneously indicates three awards on the award wheel.

In another embodiment, a plurality of selections are displayed to the player when the game is initiated. The player picks one of the selections to obtain a number of activated section indicators in the game. In one aspect of this embodiment, the player picks selections having either a zero or a one associated with each of the selections. After the player picks a selection, a zero or a one is revealed to the player. If a one is revealed, the gaming device activates one section indicator in the game. If a zero is revealed, the gaming device does not activate one of the section indicators in the game. The player continues to pick selections until there are no picks remaining. The numbers associated with the picked selections are combined or added together to determine the number of activated section indicators for the game. It should be appreciated that the player is preferably not able to obtain a number of activated section indicators in the game that exceeds the maximum number of section indicators in the game unless the game includes multiple spins of the wheel.

In another embodiment, the number of section indicators is determined in a sub-game. One such embodiment of the sub-game includes a plurality of selections and at least one set such as a sequence associated with each section indicator, which are displayed to the player. The selections include symbols that match symbols in each of the sets or sequences. In addition, the selections include section indicator symbols which activate one or more of the section indicators in the game. In one embodiment, the symbols in the sequences are letters and form a word or words such as a phrase. The player picks selections to obtain the letters in each of the sequences. In one embodiment, at least one of the symbols or letters in the sequences in the game include an additional award such as a number of free activations or spins. It should be appreciated that the additional award may be credits, values, bonus awards or any other suitable award.

If a player completes the sequence (i.e., word or phrase) associated with one or more of the section indicators, the gaming device activates that section indicator or section indicators in the game. In one embodiment, the sequences include at least one common symbol where a single pick by a player completes one or more of the sequences in the game. In this embodiment, the gaming device activates one, a plurality or all of the section indicators in the game based on the picks by the player.

The section indicators may also be activated by picking one of the selections including one or more of the corresponding section indicator symbols. In a further embodiment, a multiplier is associated with each sequence. The multipliers begin the sub-game at a predetermined level such as "1×." The multipliers increase by a predetermined or random amount for each revealed symbol in the sequences associated with the multipliers. The player continues to pick selections from a plurality of selections until the player picks one or more of the section indicator symbols, completely reveals all of the symbols in one or more of the sequences or runs out of picks. If the player revealed all of the symbols in one or more of the sequences or the player picked one or more of the section indicator symbols, the gaming device activates those section indicators in the game.

In one such game, the player receives a number of spins or activations of the wheel. The gaming device causes the wheel to spin and the activated section indicators indicate sections on the wheel. The player obtains a cumulative award which equals the awards indicated by each of the activated section indicators multiplied by the multiplier associated with the activated section indicators. The multiplied awards are summed together and provided to the player as the total award for the game. The player continues to spin the wheel and obtain awards until the player does not have any spins remaining. The game ends and the player obtains the total award indicated in the total award display.

In a further embodiment, the present invention is employed in a primary game. In one such embodiment, the primary game includes a plurality of reels. The reels include a plurality of symbols and section indicator symbols which represent a number of activated section indicators in a bonus game. The processor of the gaming device causes the reels to spin, and activates the section indicators in the bonus game according to the number of section indicator symbols that appear on the reels. The section indicator symbols may indicate specific section indicators to activate in the bonus game or indicate the total number of section indicators to activate in the bonus game. In another embodiment, the section indicator symbols on the reels include a number which corresponds to a number of activated section indicators. The player spins the reels and attempts to obtain one or more of the section indicator symbols located on the reels. The gaming device activates the number of section indicators corresponding to the largest number on the section indicator symbols. In a further embodiment, the primary game includes a plurality of selections as described above. The player picks the selections to activate one or more section indicators in the bonus game. In another embodiment, a specific combination of symbols on the reels is associated with the section indicators in a game. The gaming device spins the reels and activates any of the section indicators based on the specific combinations of symbols indicated on the reels.

In another embodiment, the section indicators each include a different color or colors. The gaming device displays a plurality of reels including a plurality of activator symbols, each of the activator symbols including one of the colors associated with each of the section indicators. The gaming device or player spins the reels and the gaming device activates one or more of the section indicators based on the activator symbol or symbols that occur on the reels. For example, if a blue activator symbol is indicated on the reels, the gaming device activates the section indicator including the color blue.

In a further embodiment, each of the reels includes a color corresponding to a color associated with the section indicators. Each of the reels also includes at least one activator symbol. The gaming device or player activates the reels to indicate one or more symbols on the reels. Then, the gaming device activates the section indicators based on which reels the activator symbols are indicated on in the game. For example, a game includes three reels, a blue reel, a red reel and a yellow reel, which respectively correspond to a blue, red and yellow section indicator in the game. The blue section indicator is activated when at least one activator symbol is indicated on the blue reel. The red section indicator is activated when at least one activator symbol is indicated on the red reel. The yellow section indicator is activated when at least one activator symbol is indicated on the yellow reel. It should be appreciated that the symbols and or reels may include one or more colors or one or more combinations of colors.

In another embodiment, at least one puzzle is associated with the section indicators in a game. In this embodiment, the gaming device activates the section indicator or indicators associated with the puzzle or puzzle completed by the player in the game. In another embodiment, the gaming device displays a single puzzle having multiple components to the player. One or more of the components are associated with the section indicators. Therefore, the gaming device activates the sections indicators based on which components and/or the number of components of the puzzle completed by the player in the game. It should be appreciated that any number of components and/or puzzles may be employed in a game.

In a further embodiment, one or more puzzles such as the sequences described above are employed in a persistence game. In this type of game, the player picks symbols such as letters in one or more of the sequences. The picked symbols remain revealed for a designated number of games. Thus, one player may complete one or more of the sequences during the designated number of games. Additionally, one player may pick and reveal symbols in one or more of the sequences in one game and a subsequent player or players may complete the sequence or sequences in a subsequent game or games.

In an alternative embodiment of the present invention, the gaming device displays an award indicator or award display device to a player. The award indicator or display includes a plurality of award symbols. A plurality of activatable symbol indicators are positioned adjacent to and associated with the award symbols. The gaming device enables the player to interact with the game by allowing the player to pick at least two of the symbol indicators on the award indicator to activate the picked symbol indicators. Once the symbol indicators are activated, the gaming device causes the award indicator or display to move to indicate award symbols with the activated symbol indicators. The awards associated with the indicated award symbols are provided to the player and the game ends. Therefore, the gaming device of the present invention enables a player to obtain multiple awards in a single activation of the award indicator which increases the player's excitement and enjoyment of the game. Additionally, the player has an opportunity to obtain a large award in the game which further increases the player's excitement and enjoyment of the game.

In one alternative embodiment, the gaming device includes a rotatable mechanical award indicator such as a sphere or ball which is rotatably connected to and moves relative to a housing attached to the top of the cabinet of the gaming device. The award indicator includes a plurality of award symbols and a plurality of activatable symbol indicators which indicate one or more of the award symbols and provide associated awards to a player. In one embodiment, the award indicator or display includes two sets of award symbols. A first set of the award symbols is positioned near the top or upper portion of the award indicator and a second set of the award symbols is positioned near the bottom or lower portion of the award indicator. A plurality of activatable symbol indicators are positioned adjacent to or associated with each set of award symbols on the award indicator.

In one embodiment, a plurality of awards are associated with each set of the award symbols. In one aspect of this embodiment, at least one of the awards associated with the sets of award symbols are the same. In another aspect of this embodiment, a plurality of the awards associated with the sets of award symbols are the same. In a further aspect of this embodiment, all of the awards associated with the sets of award symbols are the same. In another embodiment, all of the awards associated with the sets of award symbols are different. It should be appreciated that the awards may be values, prizes, modifiers, free spins, free games, game elements or any other suitable award or awards in a game.

In one embodiment, one or more of the symbol indicators associated with each set of award symbols are selected and activated to indicate one or more of the award symbols in each of the sets. In one embodiment, the gaming device selects and activates at least one of the symbol indicators in each set. In another embodiment, the gaming device enables the player to select and activate one or more symbol indicators in each set. In one aspect of this embodiment, the gaming device enables the player to press or otherwise activate the symbol indicators on the award indicator. In another aspect of this embodiment, the gaming device provides a selection display which includes a plurality of first and second inputs associated with the first and second symbol indicators on the award indicator. The player picks at least one of the first inputs and at least one of the second inputs to activate or otherwise highlight the corresponding first symbol indicator and second symbol indicator on the award indicator in the game. In a further embodiment, the symbol indicators are activated based on a wager made by the player. It should be appreciated that the symbol indicators may be randomly selected and activated, pre-selected and activated or selected and activated according to any suitable method. The symbol indicators may be pointers, arrows or any other suitable indicator or indicators desired by the game implementor. It should also be appreciated that any suitable number of symbol indicators may be activated in a game.

In one embodiment, the gaming device enables a player to pick one of the symbol indicators from each set of symbol indicators in the game. The gaming device activates or otherwise highlights the picked symbol indicators and rotates the award indicator. When the award indicator stops rotating, the activated symbol indicators indicate one of the award symbols in each of the sets of award symbols in the game. The gaming device then provides a first award associated with the indicated award symbol in the upper set of award symbols and a second award associated with the indicated award symbol in the lower set of award symbols. In one embodiment, the first and second awards are values and the gaming device sums or adds the awards or values together to provide a total award to the player for the game. In another embodiment, the awards are values and the gaming device multiplies the first award and the second award together to provide a total award to the player in the game. It should be appreciated that the first awards and/or the second awards may be values, modifiers, free spins, free games or any other suitable type of awards or modifiers in the game.

In one alternative embodiment, the first and second award symbols on the award indicator include at least one bonus symbol. If the bonus symbol is indicated by an activated first symbol indicator or an activated second symbol indicator, the gaming device provides at least one free spin or activation of the award indicator in the game. This enables a player to obtain additional activations or spins of the award indicator and thereby additional awards in the game. If the activated symbol indicators in a game indicate a bonus symbol and an award such as a value, the gaming device provides the award to the player and at least one free spin or activation of the award indicator in the game. It should be appreciated that the bonus symbols may be any suitable symbols or images desired by the game implementor. It should be appreciated that the first and second award symbols may include one or a plurality of bonus symbols in a game.

In another alternative embodiment, the first awards associated with the first award symbols are values and the second awards associated with the second award symbols are different awards such as modifiers. In this embodiment, the gaming device modifies the value associated with the indicated first award symbol with the modifier associated with the indicated second award symbol to provide a total award to a player in a game. It should be appreciated that the awards may be values, prizes, modifiers, free spins, free games, game elements or any suitable award or awards.

In a further alternative embodiment, the gaming device includes a plurality of award indicators. In one aspect of this embodiment, each award indicator includes a plurality of award symbols and a plurality of symbol indicators positioned adjacent to the award symbols on each of the award indicators. In one embodiment, each award indicator independently rotates and the activated symbol indicators on each of the award indicators indicates an award symbol on each award indicator. The awards associated with the indicated award symbols are combined and provided to the player as a total award indicated by a total award display.

In one embodiment, at least one of the awards associated with the award symbols on each of the award indicators is the same. In another embodiment, a plurality of the awards associated with the award symbols on each of the award indicators are the same. In a further embodiment, all of the awards associated with the award symbols on all of the award indicators are the same. In another embodiment, the awards associated with the award symbols on each of the award indicators are different. For example, on one award indicator, the awards associated with the award symbols include values and on a different award indicator, the awards associated with the award symbols are modifiers such as multipliers. It should be appreciated that any suitable award may be associated with the award symbols on each of the award indicators and any suitable combination of awards may be associated with the award symbols on each of the award indicators.

In another embodiment, the first and second award symbols are related to each other. In this embodiment, the first and second award symbols are arranged or positioned on the award indicator so that the average expected award provided to the player (i.e, the combination of the first and second awards associated with indicated first and second award symbols) is approximately the same in a game. In another embodiment, the first and second award symbols are arranged on the award indicator so that the average expected award is different for one or more indications of the first and second award symbols in the game. It should be appreciated that the average expected award may be the same or change in a single game or a plurality of games.

In another embodiment of the present invention, the gaming device includes a plurality of primary reels or symbol generators and at least one additional, extra, secondary or bonus reel or other suitable symbol generator. In this embodiment, each of the primary reels includes a plurality of symbols and the secondary symbol generator or secondary reel includes a plurality of award indicator activator symbols. Each award indicator activator symbol represents zero, one or more award indicators to be activated for one or more activations of the award generator, such as a wheel. In one embodiment, each award indicator activator symbol is associated with one of the award indicators of the award generator. In another embodiment, at least one and preferably a plurality of the award indicator activator symbols are associated with a plurality of the award indicators of the award generator. In another embodiment, at least one and preferably a plurality of the award indicator activator symbols are associated with each of the indicators of the award generator. It should be appreciated that in this embodiment, the award indicators and the award indicator activator symbols may each be designated with a color, number, image or other characteristic in order to display which award indicator activator symbols are associated with which award indicators.

In one embodiment, each award indicator activator symbol is associated with one or more section indicators of the award wheel. In this embodiment, one award indicator activator symbol may be associated with one section indicator of the wheel while another award indicator activator symbol may be associated with two or more of the section indicators of the wheel.

In operation of this embodiment, upon a suitable triggering event, the primary reels are activated to spin to generate a plurality of symbols. If a predetermined event occurs, such as the generation of a designated symbol or symbol combination, the extra or secondary reel is activated. The activated extra reel generates at least one award indicator activator symbol and the award indicators associated with the generated award indicator activator symbol(s) are activated for one or more activations of the award generator. For example, if the extra reel generates and indicates an award indicator activator symbol, then the gaming device activates the section indicator associated with the generated award indicator activator symbol for one or more spins of the wheel.

After determining which award indicators are activated for one or more activations of the award generator, the gaming device activates the award generator to generate one or more awards or award symbols. In this embodiment, any award(s) indicated by the activated award indicator(s) are provided to the player and the game ends. For example, upon a designated symbol combination on the primary reels, the extra reel may spin and generate a blue award indicator activator symbol. In this example, the blue section indicator (associated with the generated blue award indicator activator symbol) would be active for one or more spins of the wheel and any award indicated by the active blue section indicator is provided to the player. In another example, if the extra reel generates a blue/yellow award indicator activator symbol, then both the blue section indicator and the yellow section indicator are activated for one or more spins of the wheel.

In another embodiment, in addition to the plurality of primary reels, the gaming device includes a plurality of independent supplemental reels. Each of the independent supplemental reels is individually associated with one or more award indicator activator symbols which each represent different award indicators of an award generator, such as a wheel. That is, one supplemental reel will include one type of award indicator activator symbol which is associated with one award indicator while another supplemental reel will include another type of award indicator activator symbol which is associated with another type of award indicator. In one embodiment, each independent supplemental reel is also associated with one or more non-award indicator activator symbols. As described above, the award indicators and the award indicator activator symbols may each be designated with a color, number, image or other characteristic in order to display which award indicator activator symbols are associated with which award indicators.

In one embodiment, each award indicator activator symbol is associated with one or more section indicators of the award wheel. In this embodiment, one supplemental reel will include one type of award indicator activator symbol which is associated with one section indicator of the award wheel and another supplemental reel will include another type of award indicator activator symbol which is associated with another section indicator of the award wheel.

In this embodiment, the primary reels are activated to spin to generate a plurality of symbols. If a predetermined event occurs, one or more of the independent supplemental reels are activated. In other embodiments, the number and type of independent supplemental reels which are activated is predetermined, randomly determined, determined based on the player's wager, determined based on generated designated symbol combination or determined based on any other suitable manner.

Each activated independent supplemental reel spins to generate either an award indicator activator symbol or a non-award indicator activator symbol. For each activated independent supplemental reel which generates an award indicator activator symbol, the gaming device activates the award indicator associated with that generated award indicator activator symbol for one or more activators of the award generator. In other embodiments, the number of activations of an award generator is predetermined, randomly determined, determined based on the player's wager, determined based on generated designated symbol combination or determined based on any other suitable manner.

For each activated independent supplemental reel which generates a non-award indicator activator symbol (i.e., generates a blank symbol), the gaming device does not activate any award indicator of the award generator. After determining which award indicators will be activated for one or more activations of an award generator, the gaming device activates the award generator to generate a plurality of award symbols. Any awards associated with any of the award symbols indicated by the activated award indicator(s) are provided to the player and the game ends.

It is therefore an advantage of the present invention to provide a gaming device having an award indicator such as an award wheel with multiple section indicators that provides more awards to players.

Another advantage of the present invention is to provide a gaming device having multiple player selectable symbol indicators.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
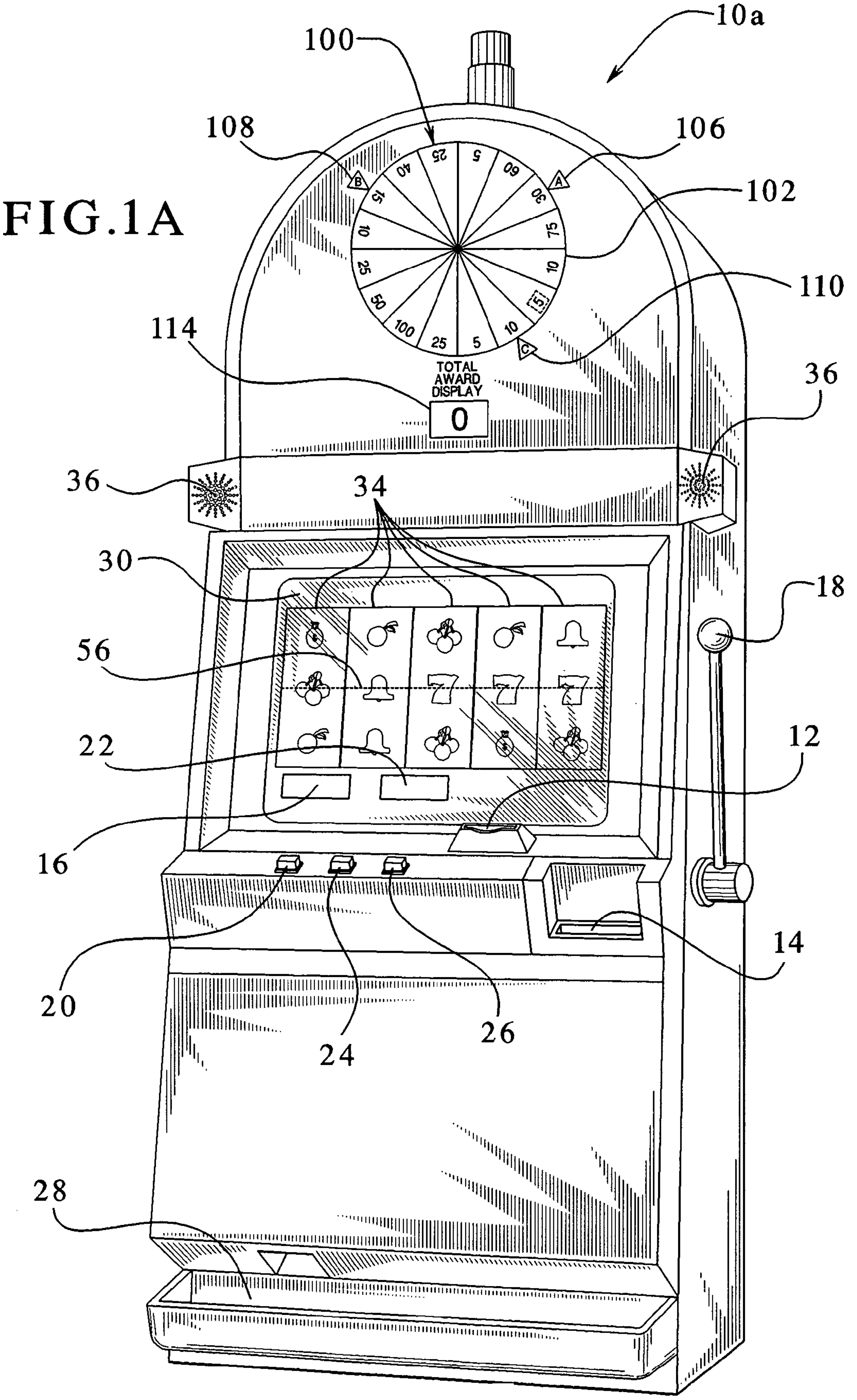
FIG. 1A is a front perspective view of one embodiment of the gaming device of the present invention.
Figure 1B:
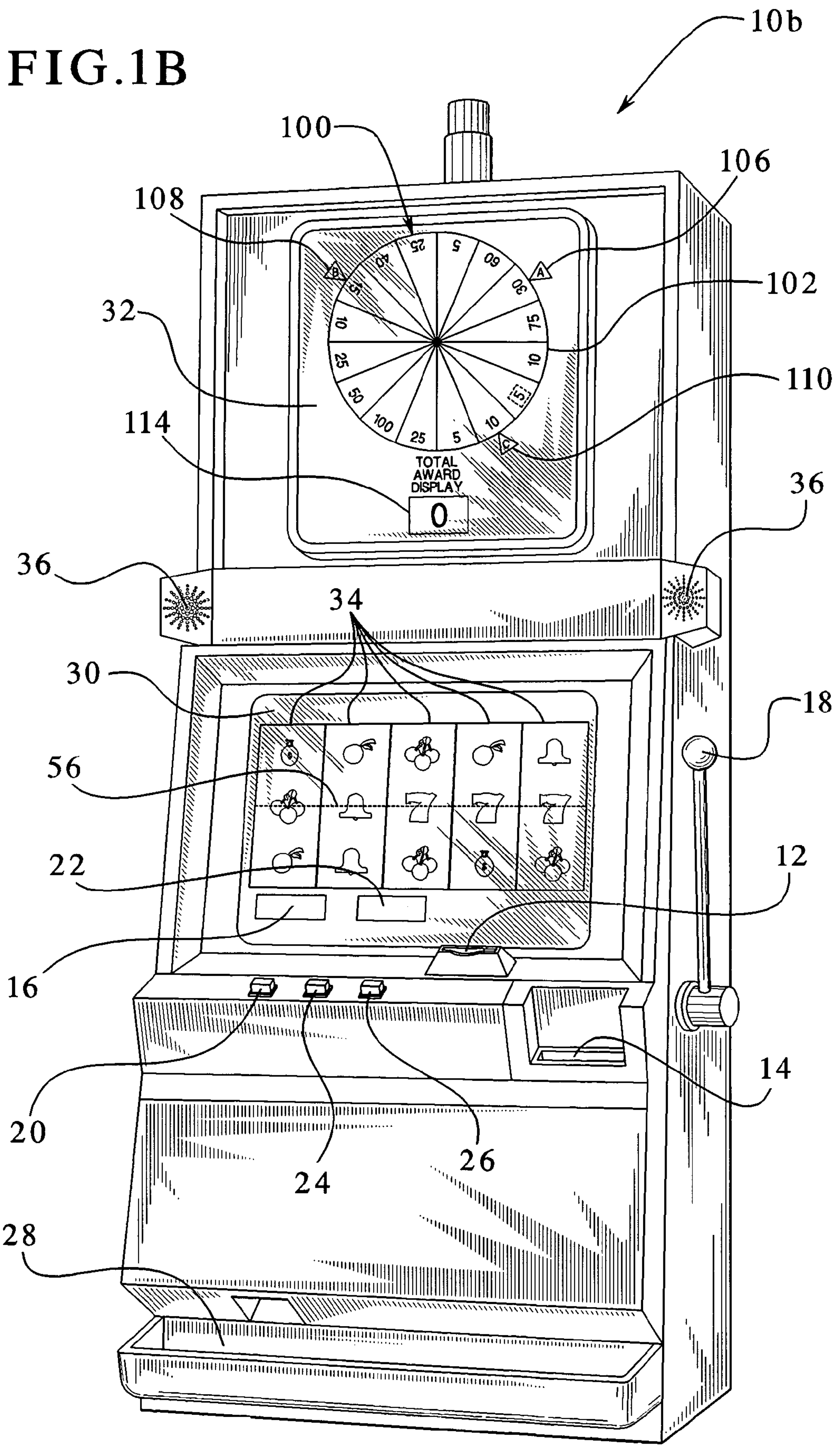
FIG. 1B is a front perspective of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 in one embodiment has the controls, displays and features of a conventional slot machine. It is constructed so that a player can operate it while standing or sitting, and gaming device 10 is preferably mounted in a cabinet. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker, blackjack or keno, and any of the bonus triggering events and bonus games associated with these primary games. The symbols and indicia used on and in gaming device 10 may be in mechanical, electrical, electronic or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 17 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. Other bet or wager indicators such as a bet max button may also be employed in the gaming device of present invention.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30 and a mechanical wheel 100, and the alternative embodiment shown in FIG. 1B includes a central display device 30 as well as an upper display device 32 which displays a video image of the wheel 100 to a player. Gaming device 10 in one embodiment displays a plurality of reels 34 such as three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor. Each reel 34 displays a plurality of indicia such as bells, hearts, fruits, numbers, letters, bars or other images which preferably correspond to a theme associated with the gaming device 10. Furthermore, gaming device 10 preferably includes speakers 36 for producing sounds such as music.

Figure 2:
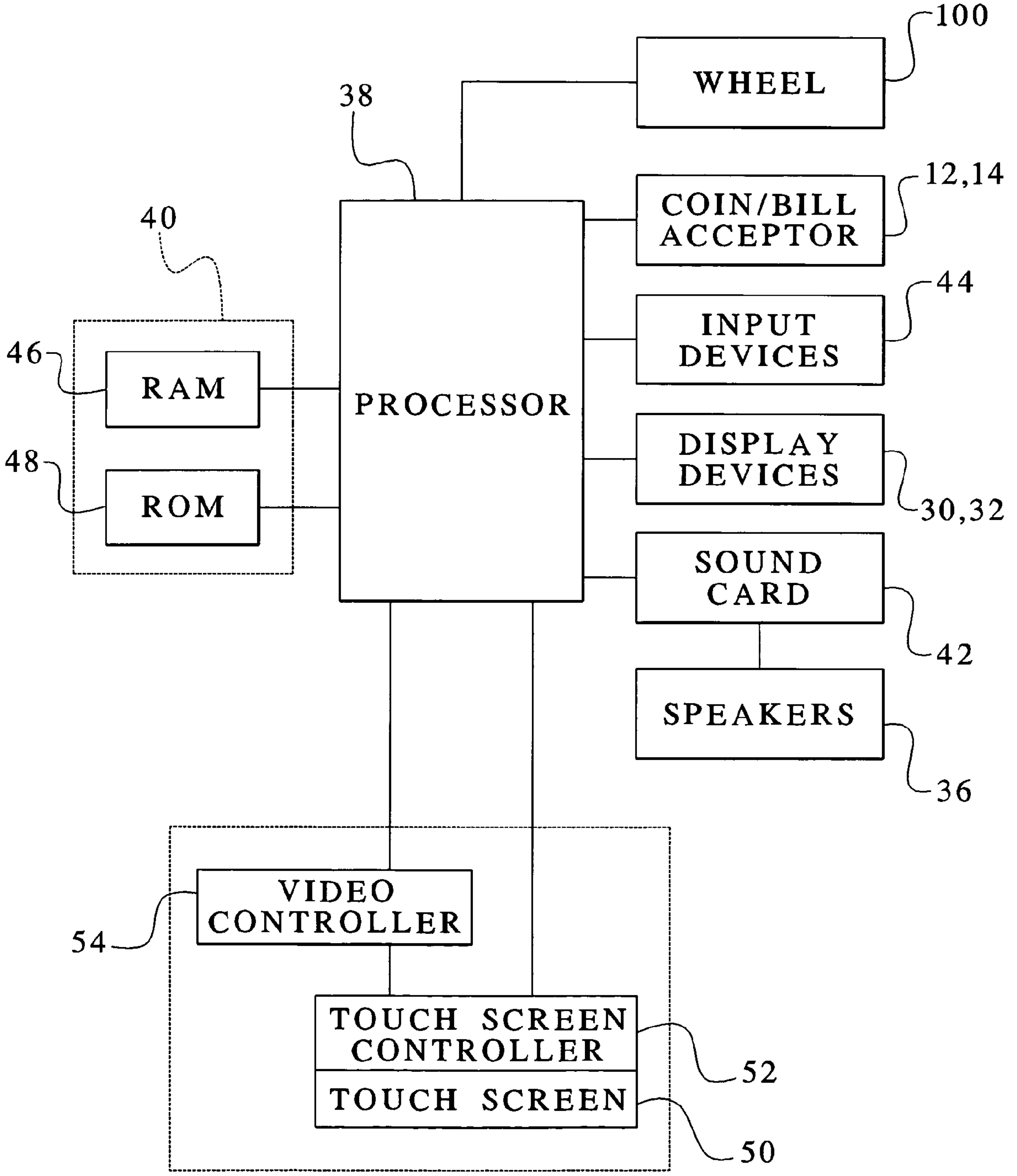
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a mechanical wheel 100; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. One or more secondary processors may also be employed in conjunction with the primary processor to control certain aspects of the game function. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 are generally referred to herein as the "computer" or "controller."

With reference to FIGS. 1A, 1B and 2, to operate the gaming device 10, in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, in one embodiment gaming device 10 also gives players the opportunity to win credits in a bonus game. This type of gaming device 10 will include a program which will automatically begins a bonus game when the player has achieved a qualifying condition in the game. This qualifying condition can be a particular arrangement of indicia on a display device. The gaming device 10 may use mechanical devices or a video-based central display device 30 to enable the player to play the bonus game. In one embodiment, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Bonus Game

In one embodiment of the present invention, if a player achieves a bonus triggering or qualifying condition during the primary game, the gaming device 10 initiates the secondary or bonus game of the present invention.

Figure 3:
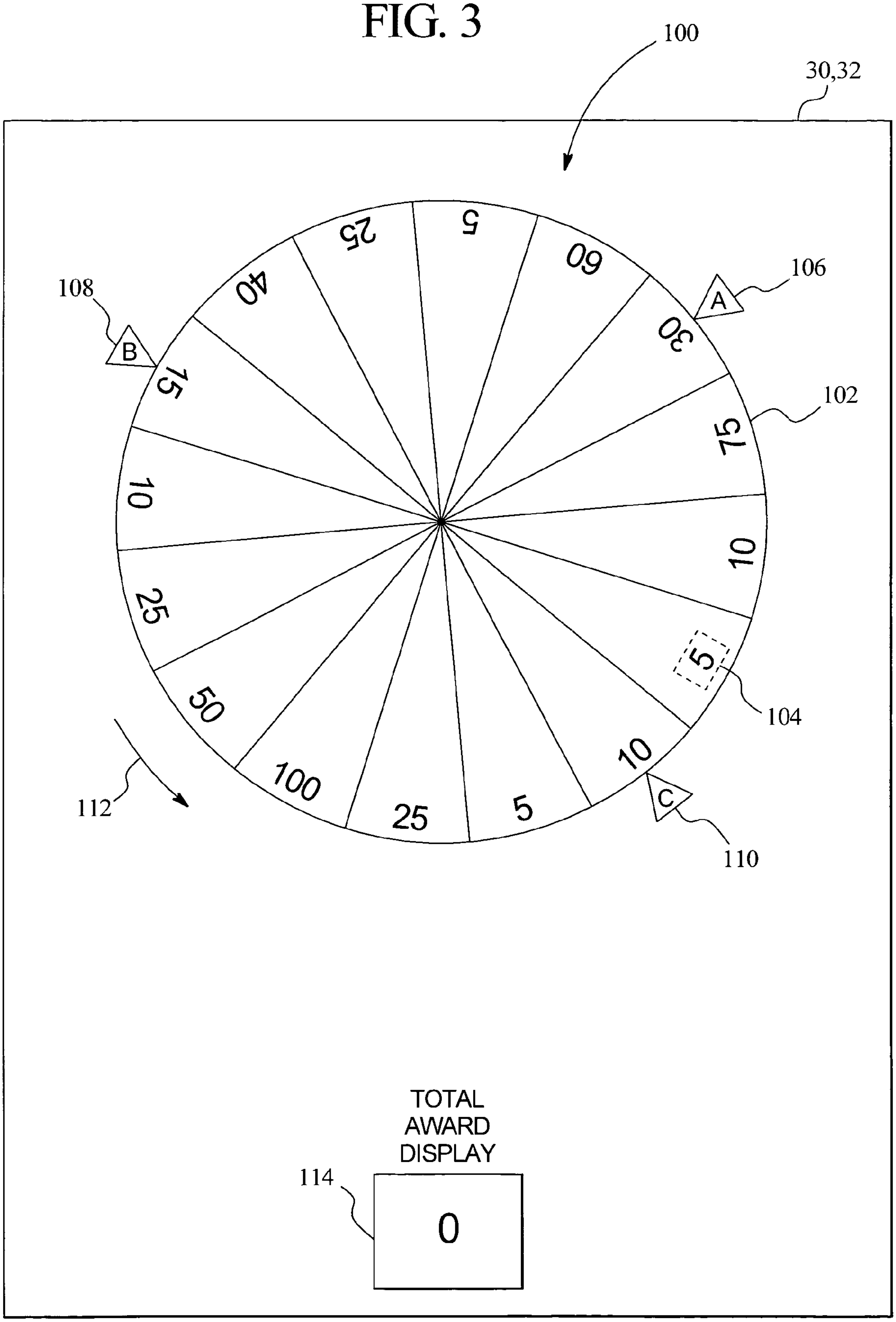
FIG. 3 is an enlarged front elevation view of one of the display devices of FIGS. 1A and 1B illustrating one embodiment of the present invention.

Referring now to FIG. 3, one embodiment of the present invention is illustrated where the bonus game includes a mechanical or video wheel 100 having a plurality of sections 102. An award symbol 104 is associated with each section 102. One or more awards are associated with the award symbols 104. The awards may be any suitable award such as values, credits, free spins, free games, multipliers or award opportunities as desired by the game implementor. The gaming device includes a plurality of award indicators such as section indicators 106, 108 and 110, designated by the letters A, B and C, respectively, which are associated with the wheel 100. It should be appreciated that the indicators 106, 108 and 110 may by designated by colors, characters, numbers, images or any suitable designator. Each section indicator is adapted to indicate one of the sections 102 on the wheel 100. In one embodiment, the wheel rotates in a counter clockwise direction as indicated by arrow 112 in FIG. 3. It should be appreciated, however, that the wheel may rotate in a clockwise direction, a counter clockwise direction, or any combination therein. It should also be appreciated that the wheel may remain stationary and the section indicators may move about the wheel or both the wheel and the section indicators may move in the same direction or different directions. A total award display 114 indicates the total award obtained by the player in the game. The total award displayed in the total award display 114 at the end of the game is the total award provided to the player for the game.

Figure 4:
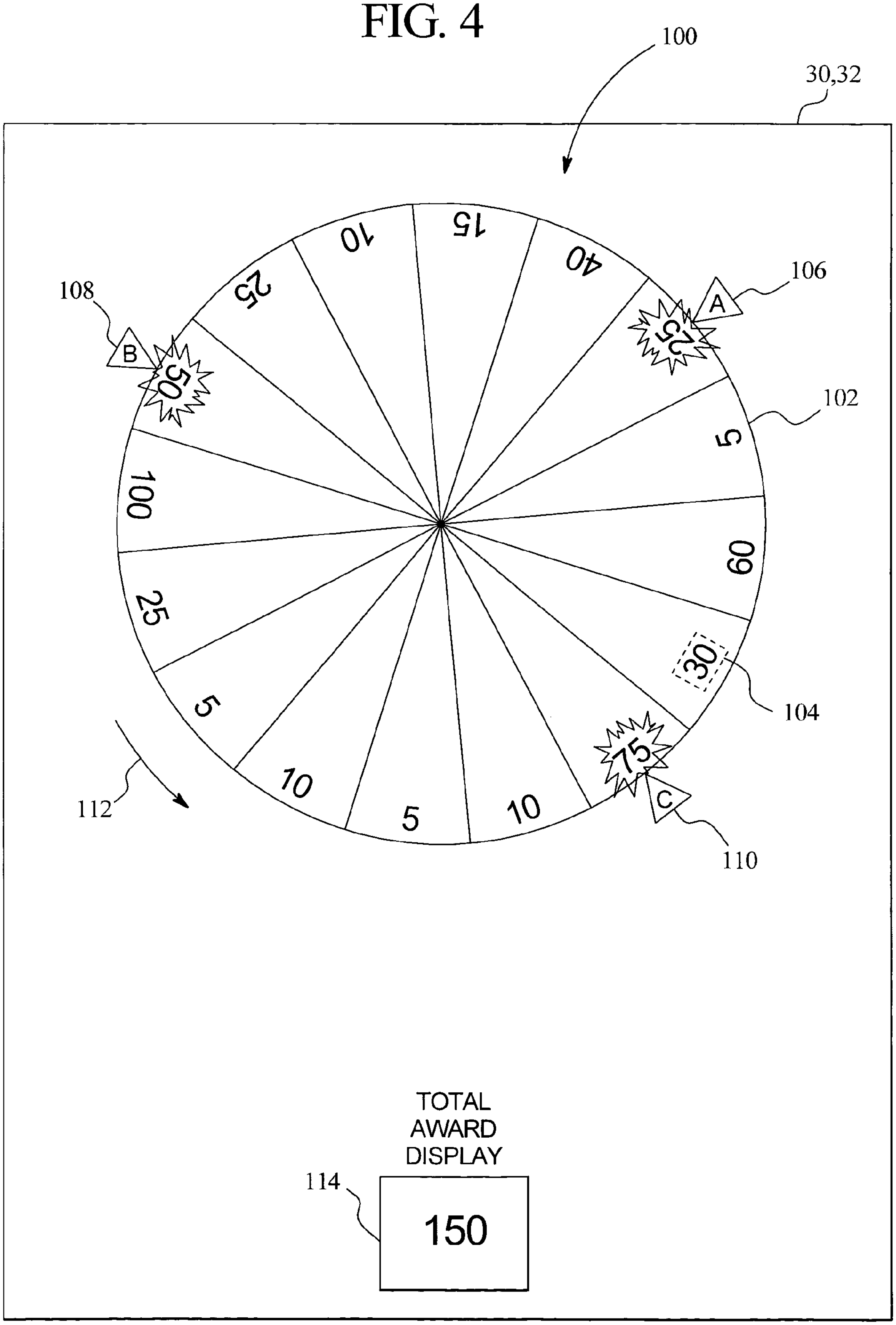
FIG. 4 is an enlarged front elevation view of one of the display devices of FIGS. 1A and 1B illustrating an example of the embodiment of FIG. 3 where three activated section indicators indicate different sections on an award wheel.

Referring to FIG. 4, in one embodiment, the gaming device activates a predetermined number of section indicators at the start of the game. In another embodiment, the gaming device activates a random number of section indicators. In a further embodiment, the player's wager in the base game or primary game determines the number of section indicators that are activated in the game. In FIG. 4, the gaming device activates all three of the section indicators A, B and C, or 106, 108 and 110, respectively which are provided in the game. Each activated section indicator is adapted to indicate a section 102 on the wheel 100. In this embodiment, the player has one spin in the game. The player receives the awards associated with the award symbols indicated by the activated section indicators 106, 108 and 110. It should be appreciated, however, that the gaming device may provide multiple spins in the game.

In FIG. 4, the gaming device activates or spins the wheel 100. When the wheel stops spinning, the activated section indicators 106, 108 and 110 indicate sections on the wheel having awards of twenty-five, fifty and seventy-five, respectively. The awards are added or summed to provide the total award for the game to the player. In this example, the total award indicated by the activated section indicators 106, 108 and 110 is one hundred fifty. The award of one hundred fifty is transferred to the total award display 114 and is provided to the player in the game. It should be appreciated that the awards may be summed, multiplied, or modified in any other suitable manner desired by the game implementor.

Figure 5A:
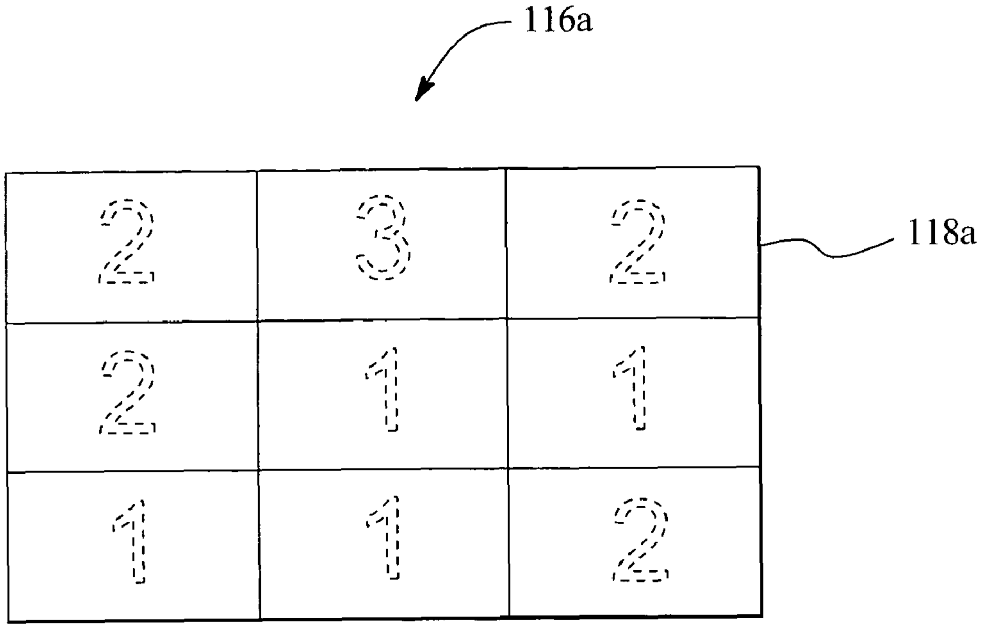
FIGS. 5A and 5B are schematic diagrams illustrating embodiments of the present invention where the number of activated section indicators employed in a game is based on a plurality of selections.
Figure 5B:
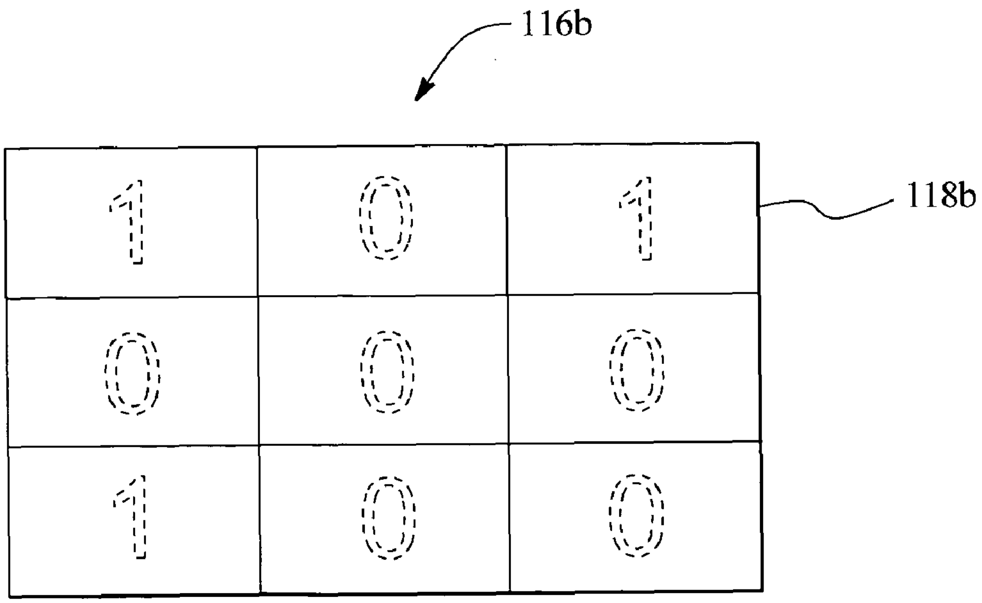

In another embodiment, illustrated in FIGS. 5A and 5B, a plurality of masked selections are displayed to the player prior to or at the start of the game. The gaming device enables the player to pick one or more of the masked or hidden selections to determine and activate a number of section indicators in the bonus game.

Referring to FIG. 5A, the plurality of selections 116*a* include selections 118*a*. Numbers such as integers "1," "2" and "3" are randomly associated with the selections 118*a* and represent the number of activated section indictors in a game. It should be appreciated that the value of the largest integer associated with the selections is equal to or less than the maximum number of section indicators in a game. Initially, the selections 118*a* are masked or hidden from the player. The player is provided with a number of picks from the selections 118*a* to pick a number of section indicators to activate in the game. In one embodiment, the player is provided with one selection from the pluraltyi of selections 116*a*. The player may activate "1", "2" or "3" section indicators as illustrated in FIG. 5A. In one example, the player receives one pick from the plurality of selections 116*a*. If the player picks selection 118*a*, which reveals the number "2," the gaming device activates two of the section indicators in the game. In another example, if the player picks a selection 118*a*, which reveals the number "3," the gaming device activates three of the section indicators in the game. It should be appreciated that the gaming device may activate specific indicators or randomly activate one or more of the section indicators.

Referring now to FIG. 5B, the plurality of selections 116*b* includes symbols such as numbers "0" and "1". The player receives a number of picks to pick the selections. When the player picks one of the selections, one of the numbers such as the "0" or "1," is revealed and displayed to the player. The sum of the numbers associated with the picked selections equals the number of activated section indicators provided to the player in the game. In one embodiment, the sum of the numbers associated with the selections is greater than the number of possible section indicators in the game. In this embodiment, the player has a greater chance of activating the maximum number of section indicators in the game.

In FIG. 5B, the player can activate up to three section indicators in the game. Therefore, the player may obtain "0," "1," "2" or "3" activated section indicators in the game after picking one or more of the selections. If the player picks a selection 118*b*, which reveals the number "1," the gaming device activates one of the section indicators in the game. Subsequently, if the player picks two of the other selections 118*b* where both picked selections reveal the number "1," the player receives the total or sum of the numbers associated with the picked selections, which is three. Thus, the gaming device activates the maximum number of section indicators (i.e., three) in the game. It should be appreciated that the player may pick and the gaming device may activate any number of section indicators depending on the numbers associated with the selections. It should also be appreciated that a plurality of symbols may be used to represent the numbers of activated section indicators in the selections wherein a player picks a selection having a symbol and receives the number of activated section indicators associated with the picked symbol.

Figure 6:
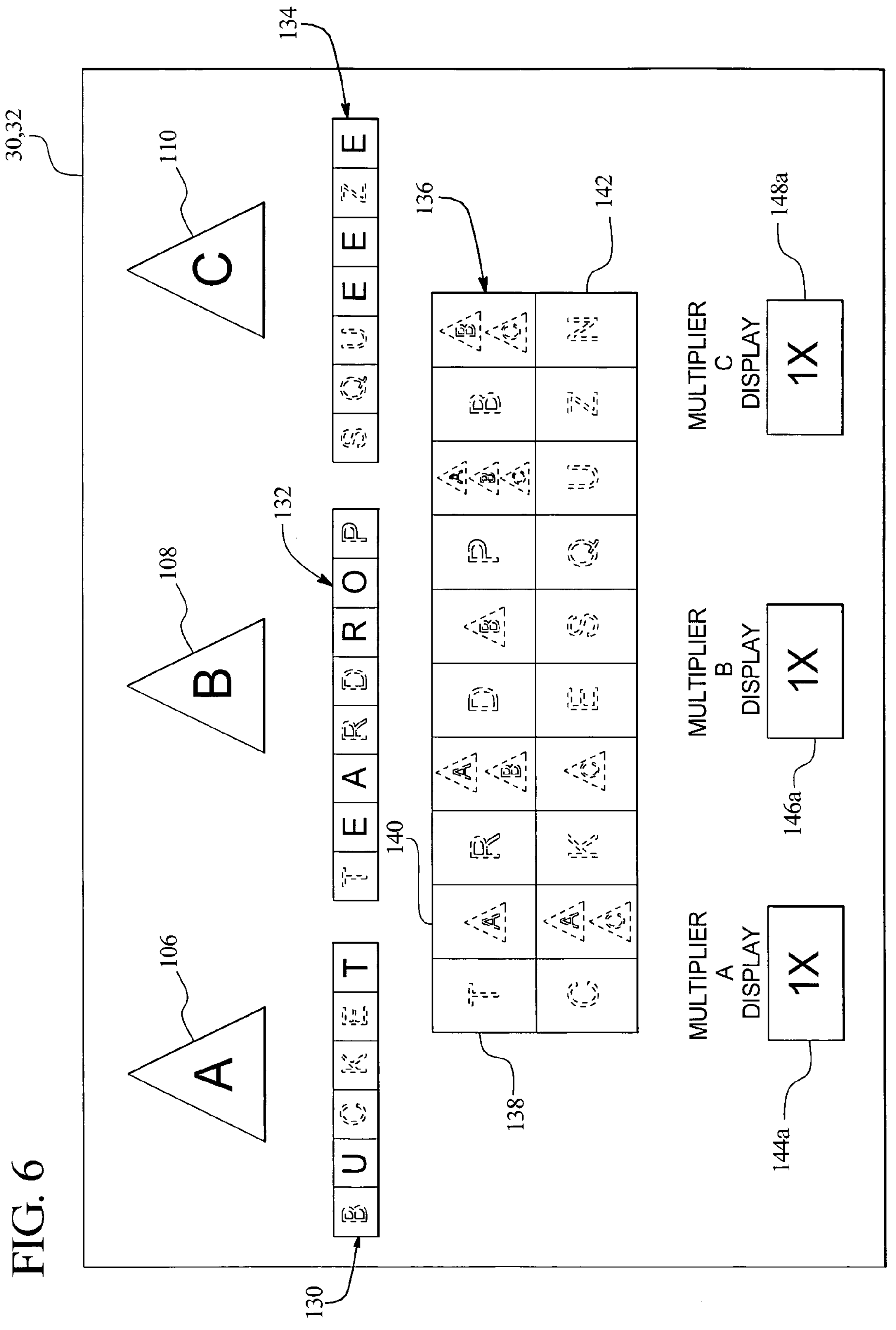
FIG. 6 illustrates another embodiment of the present invention where the number of activated section indicators and associated multipliers are determined in a sub-game.

In another embodiment illustrated in FIG. 6, the number of activated section indicators is determined in a sub-game. In one such sub-game, the gaming device displays a set such as a sequence or sequences 130, 132 and 134 and a plurality of selections 136 to the player. In the illustrated embodiment, each section indicator 106, 108 and 110 has an associated set or sequence 130, 132 and 134, respectively. Each sequence includes symbols such as letters, numbers or any other desired character or symbol. In this embodiment, the symbols are letters which form a word or phrase. The letters in the sequences are initially masked or hidden from the player. In one embodiment, the player picks symbols such as letters to complete one or more of the sequences. The gaming device then activates the section indicator or section indicators associated with the completed sequence or sequences. In this embodiment, the sequences include one or more common symbols where a single pick of the symbols in one of the sequences completes one, two or more of the sequences in the game. Thus, a single pick activates one or more of the section indicators in the game.

The selections include several symbols where some of the symbols are letters such as the letter "T" indicated in selection 138 or the letter "N" indicated in selection 142. The other selections include indicator symbols such as section indicator symbols which activate one or more of the section indicators 106, 108 and 110 in the game. Therefore, one of the selections includes a section indicator symbol which activates the section indicator 106. Another of the selections includes section indicator symbol which activates the section indicator 108, and another selection includes section indicator symbol which activates the section indicator 110. Furthermore, three of the selections include combinations of the section indicator symbols which activate one or more of the section indicators 106, 108 and 110 in the game. In one selection, the section indicator symbols which activate the section indicators 106 and 108 are paired together. In another selection, the section indicator symbols which activate the section indicator symbols 106 and 110 are paired together. In a further selection, section indicator symbols which activate the section indicators 108 and 110 are paired together. In a final selection all three of the section indicator symbols are grouped together. It should be appreciated that the selections 136 are initially masked or hidden from the player so that the player does not know where a particular letter or section indicator symbol is located in the plurality of selections 136. The symbols associated with the selections 136 are revealed to the player when the player picks the selections.

In the sub-game illustrated in FIG. 6, the player picks selections 136 to reveal a matching letter or letters in one or more of the sequences.

In one embodiment, the gaming device includes a symbol or letter selector which enables a player to select one or more of the letters in the sequences. The letter selector may be a set of buttons that correspondence to each of the letters in the sequences or a plurality of selections that include the letters in the sequences as described above.

In another embodiment, some of the letters in each sequence are initially revealed to the player. The player then must attempt to pick selections 136 that reveal the remaining letters in each of the sequences.

In one embodiment, a multiplier is associated with each of the section indicators. The multipliers change in value based on the letters that are revealed in the sequences. A multiplier display is associated with each section indicator. Therefore in FIG. 6, multiplier A display 144*a* is associated with section indicator A (106), multiplier B display 146*a* is associated with section indicator B (108) and multiplier C display 148*a* is associated with section indicator C (110). The multiplier displays 144*a*, 146*a* and 148*a* indicate the value of the multiplier associated with each of the section indicators 106, 108 and 110, respectively, during the sub-game. In one embodiment, the value of the multiplier associated with each section indicator increases by one for each letter picked by the player from the plurality of selections 136 that match one of the letters in the corresponding sequences 130, 132 or 134, respectively. The multipliers may increase by a predetermined or random amount for each matched letter. It should be appreciated that the multipliers may also decrease by any amount or remain unchanged. For example in FIG. 6, if a player picks the selection that reveals the letter "P," which is associated with sequence 132, the multiplier displayed in the multiplier B display 146*a* increases from "1×" to "2×." If the player picks another letter from the selections 136 that matches one of the letters in the sequence 132, the multiplier increases by one again to "3×." In one embodiment, each letter associated with the plurality of selections is associated with one of the sequences 130, 132 and 134. Therefore, in this embodiment, the player can only increase the multiplier associated with one of the section indicators 106, 108 and 110 with each pick. In another embodiment, a letter may be associated with one or more of the sequences. In this embodiment, one of the picked letters may increase the multiplier associated with one or more of the sequences associated with the section indicators.

Additionally, in one embodiment, one or more of the symbols or letters includes an additional award such as a number of free spins of the award indicator, credits, values or any suitable award or values. The gaming device provides the additional award to the player when the player picks the symbol or symbol in the game.

In the sub-game illustrated in FIG. 6, if the player picks a selection 136 that reveals one or more section indicator symbols, the gaming device activates the section indicators associated with those section indicator symbols in the game. For example, if the player picks a selection having section indicator symbols associated with section indicators 106 and 108, then the gaming device activates the section indicators 106 and 108 in the game. The gaming device does not activate section indicator 110 in the game because as of that point in the game, the player did not pick the selection having the section indicator symbol associated with section indicator 110. Similarly, if the player picks the selection including all three section indicator symbols associated with section indicators 106, 108 and 110, then the gaming device activates the maximum number of section indicators in the game, which in this example is three. Once the player picks a selection that reveals one or more section indicator symbols, the gaming device activates the section indicators associated with those symbols and the game initiates. In the game, the gaming device or the player spins the wheel illustrated in FIG. 4, having the number of activated section indicators associated with the section indicator symbols picked by the player. The awards associated with the award symbols on the indicated sections are multiplied by the multipliers associated with the activated section indicators. The multiplied awards are summed or added together and provided to the player at the end of the game.

Referring now to FIGS. 7A to 7D, an example of the embodiment of FIG. 6 is illustrated where the player is provided with a plurality of masked or hidden selections 136. In this example, the multipliers associated with section indicators 106, 108 and 110 are initially at "1×." It should be appreciated that the multipliers may start at any value and may be different values. Also, the sequences 130, 132 and 134 include a plurality of letters which form the words "BUCKET," "TEARDROP" and "SQUEEZE." However, the words may be any words or other symbol combinations desired by the game implementor.

Figure 7A:
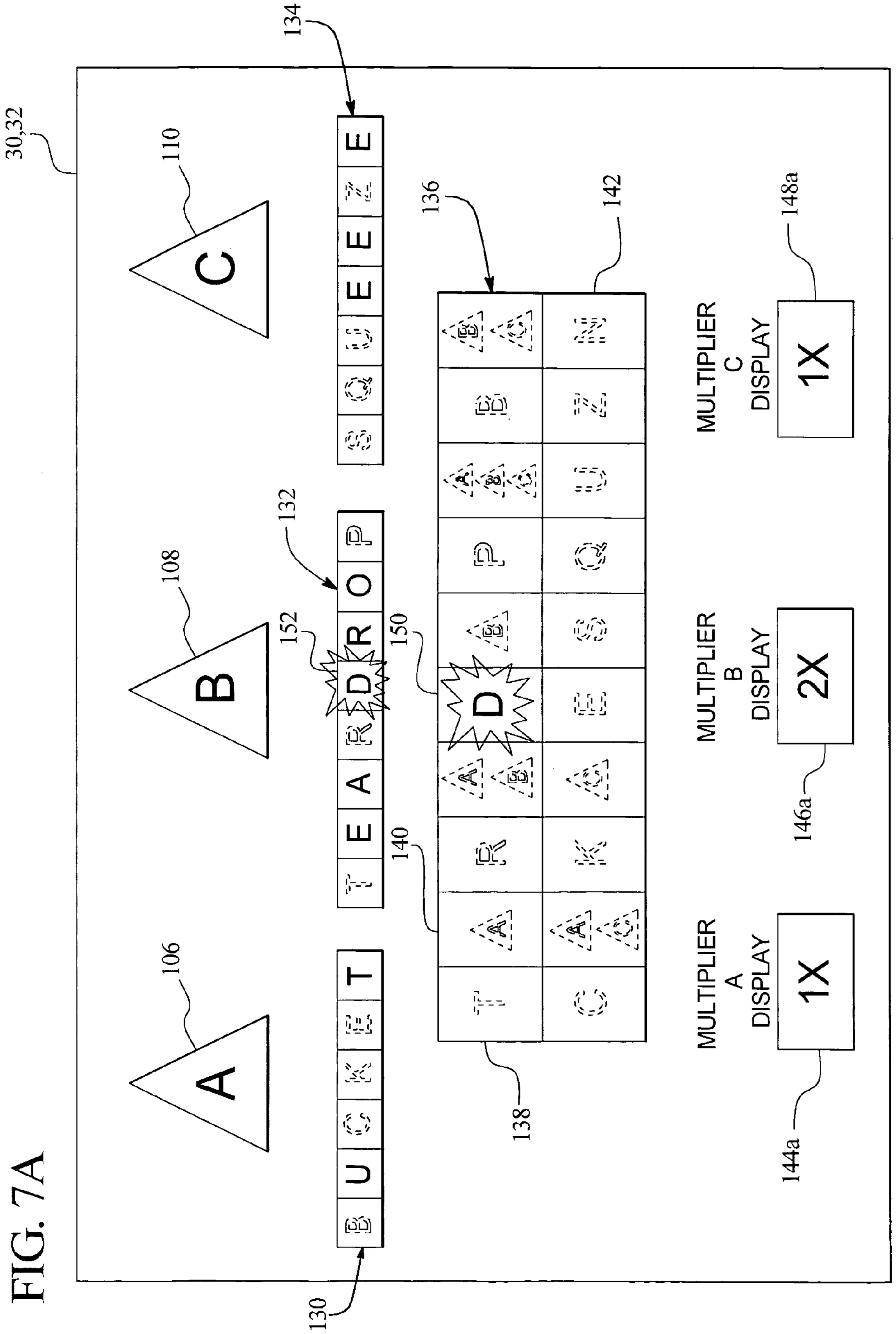
FIGS. 7A, 7B and 7C are enlarged front elevation views of one of the display devices of FIGS. 1A and 1B illustrating an example of the embodiment of FIG. 6 where a player picks three selections from the plurality of selections.

In FIG. 7A, the player picks selection 150 from the plurality of selections 136 with their first pick. The selection 150 reveals the letter "D." The letter "D" is only associated with sequence 132. Thus, the letter "D" is revealed in sequence 132 and the multiplier associated with section indicator 108, which is displayed in Multiplier "B" Display 146*a*, is increased by one from "1×" to "2×." The player continues to pick selections from the plurality of selections 136 until the player picks a selection that reveals one or more section indicator symbols.

Figure 7B:
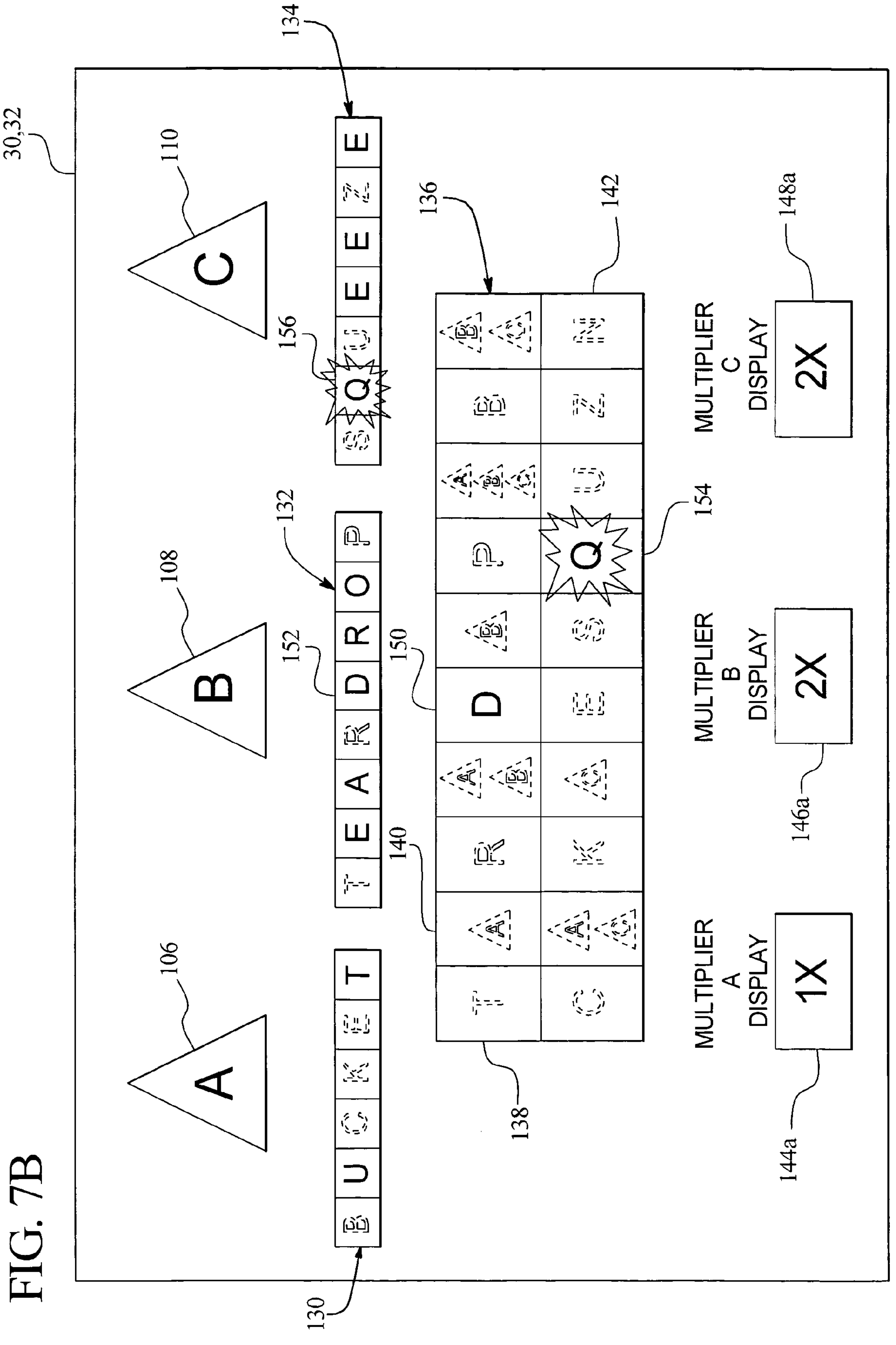

In FIG. 7B, the player picks a second selection from the plurality of selections 136. The player picks selection 154, which reveals the letter "Q." The letter "Q" is associated with sequence 134 and only appears once in that sequence. As a result, the multiplier displayed in Multiplier C Display 148*a*, which is associated with section indicator 110, is increased by one from "1×" to "2×." Since the player did not pick a selection including one or more section indicator symbols, the player continues to pick selections from the plurality of selections 136.

Figure 7C:
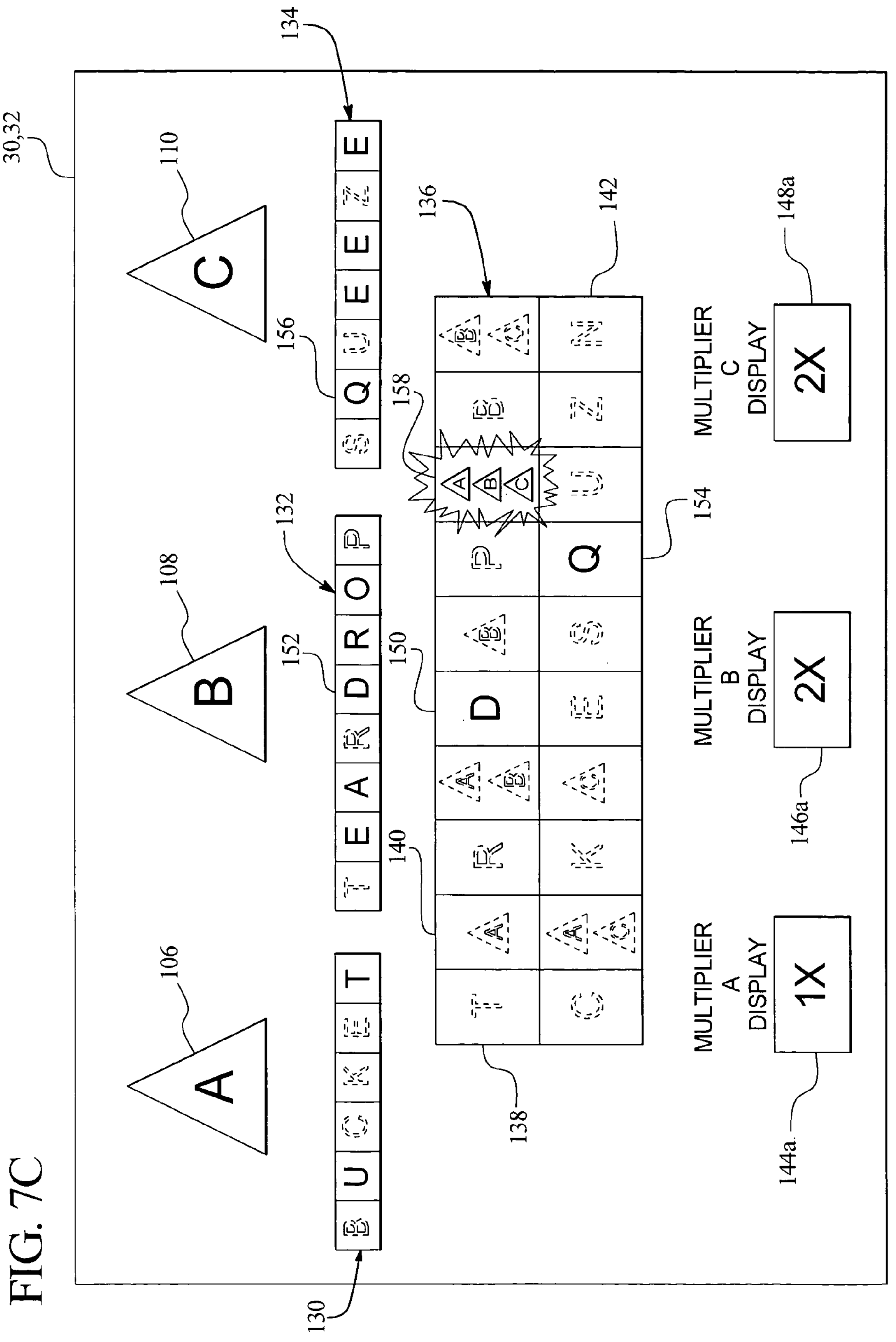

In FIG. 7C, the player picks a third selection, selection 158, from the plurality of selections 136. Selection 158 reveals three section indicator symbols. The section indicator symbols are associated with section indicators 106, 108 and 110. Therefore, the gaming device activates the maximum number of section indicators in the game. In one embodiment, the section indicator symbols are not associated with any additional awards. In another embodiment, each section indicator symbol or all of the section indicator symbols are associated with one or more additional awards, which are provided to the player when the player picks the selection associated with one or more of the section indicator symbols. In this example, the player only obtains the lowest multiplier value (i.e., 1×) for section indicator symbol 106 as indicated by Multiplier A Display 144*a*. However, the player did pick a selection that revealed one letter in the sequences 132 and 134, which are associated with section indicators 108 and 110, respectively. Thus, the player obtained a multiplier of "2×" for section indicators 108 and 110, as indicated by Multiplier B Display 146*a* and Multiplier C Display 148*a*.

In the game, the gaming device activates all three section indicators and provides the player with one spin. The player spins the wheel and receives the awards associated with the sections indicated by the activated section indicators 106, 108 and 110 in that spin. Furthermore, the award associated with each section indicated by the activated section indicators 106, 108 and 110 is multiplied by the multipliers associated with those section indicators as displayed by Multiplier A Display 144*a*, Multiplier B Display 146*a*, and Multiplier C Display 148*a*. Thus, the award indicated by section indicator 106 will be multiplied by "1×" as indicated in the Multiplier A Display 144*a*, the award indicated by indicator 108 will be multiplied by "2×" as indicated in Multiplier B Display 146*a* and the award indicated by section indicator 110 will be multiplied by "2×" as indicated by Multiplier C Display 148*a*.

Figure 7D:
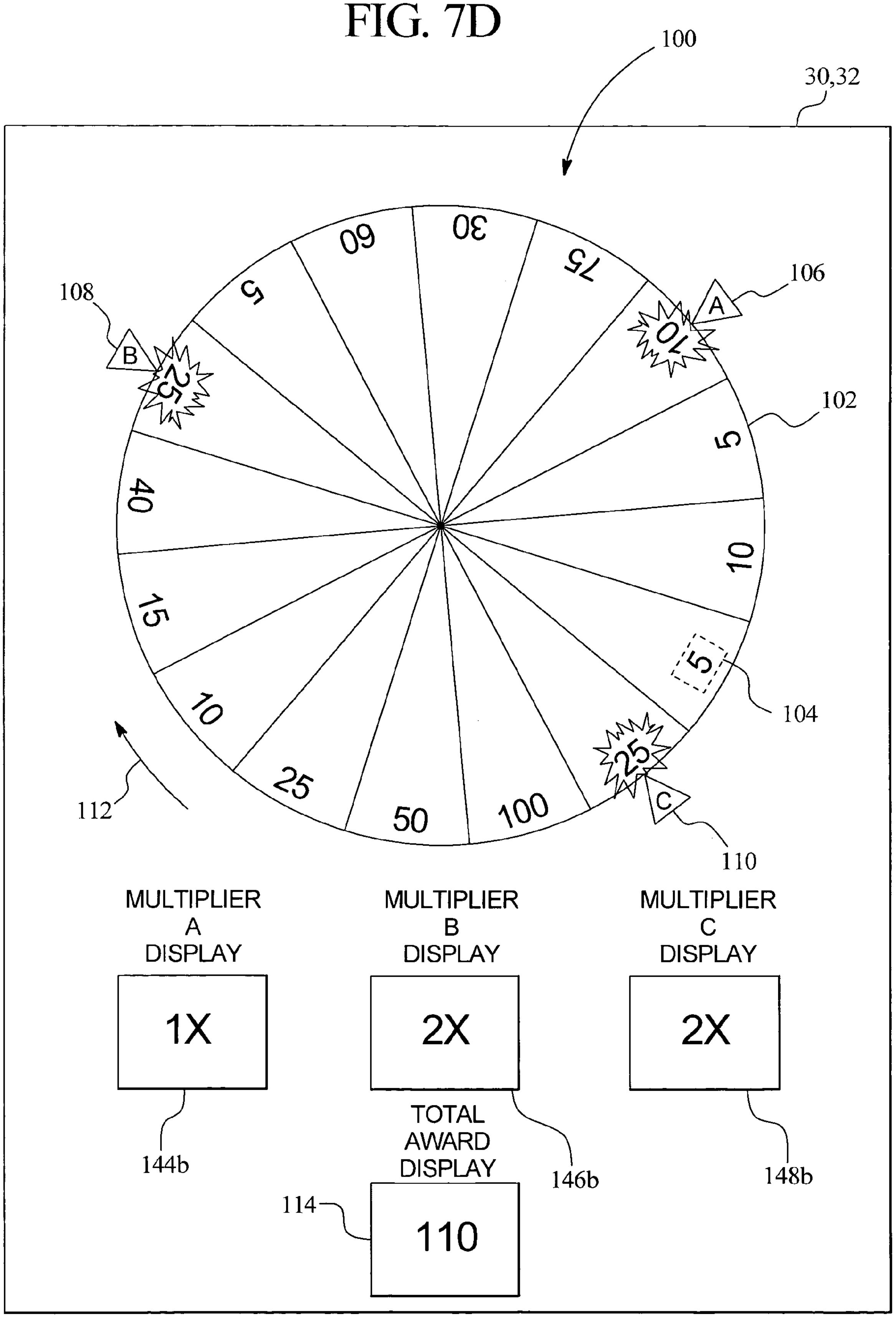
FIG. 7D is an enlarged front elevation view of one of the display devices of FIGS. 1A and 1B illustrating an award wheel where the number of activated section indicators is based on the selections picked by the player in FIGS. 7A to 7C.

Referring now to FIG. 7D, the gaming device initiates the bonus game and displays a wheel 100 having a plurality of sections 102. Several award symbols 104 are associated with sections 102. Because the player obtained all three section indicators 106, 108 and 110 in the sub-game, the gaming device activates all three section indicators, such as by illuminating or highlighting the activated section indicators, to show that all three section indicators are activated for the game. If the player only obtained two of the section indicators in the sub-game, only those two section indicators obtained by the player are activated for the game. The wheel 100 rotates in a clockwise direction as shown by arrow 112. Also, the gaming device displays a multiplier display associated with each section indicator. Multiplier A Display 144*b* is associated with section indicator A (106). Multiplier B Display 146*b* is associated with section indicator B (108). Multiplier C Display 148*b* is associated with section indicator C (110). In addition, a total award display 114 displays or indicates the total award accumulated by the player in the game.

In the game illustrated in FIG. 7D, the gaming device or the player spins the wheel 100. When the wheel stops spinning, the activated section indicators 106, 108 and 110 indicate sections including award symbols with awards of ten, twenty-five and twenty-five, respectively. Thus, the award associated with section indicator 106, which is ten, is multiplied by the multiplier associated with the section indicator 106 and indicated by Multiplier A Display 144*b*, which is "1×." The award indicated by section indicator 108, which is twenty-five, is multiplied by the multiplier associated with the section indicator 108 and indicated in Multiplier B Display 146*b*, which is "2×." The award indicated by section indicator 110, which is twenty-five, is multiplied by the multiplier associated with the section indicator 110 and indicated in Multiplier C Display 148*b*, which is "2×." Thus, the awards indicated by section indicators 106, 108 and 110 are modified or multiplied by the corresponding multipliers to become awards of ten, fifty and fifty, respectively. The awards are added or summed together to provide the total award of one hundred ten as indicated by total award display 114. The player receives the total award of one hundred ten for the game.

In a further embodiment, the present invention is employed as a primary game. In one such primary game, the number of activated section indicators may be determined on a plurality of reels, from a plurality of selections or in any suitable game. In one such primary game, the number of section indicators activated in a subsequent game such as the bonus game are determined by a plurality of reels. The reels include one or more section indicator symbols or activator symbols. The gaming device or the player spins the reels and the gaming device activates the section indicators based on the number of the section indicator symbols that appear on the reels. For example, if two section indicator symbols appear on the reels, the gaming device activates two section indicator symbols in a subsequent game. It should be appreciated that the number of section indicator symbols included on the reels equals or is less than the maximum number of section indicators available in the subsequent game such as the bonus game.

In another embodiment of the above primary game, the section indicator symbols include numbers such as integers which represent a number of section indicators to activate in a subsequent game. For example, the section indicators may include the numbers "1", "2" and "3". The gaming device or player spins the reels and the gaming device activates the number of section indicators associated with the section indicator symbol having the greatest number associated with it which appears on the reels. In a further aspect of this embodiment, a plurality of selections are displayed to the player in the primary game and the player picks selections as described above to obtain a number of activated section indicators in a subsequent game. It should be appreciated that any suitable number of section indicators may be activated in a game where the number of activated section indicators is equal to or less than the number associated with the section indicator symbol or symbols that occur on the reels.

In another embodiment, each of the section indicators in a game are associated with a specific combination of symbols on the reels. The gaming device spins the reels and activates one or more of the section indicators when the specific combination or combinations of symbols associated with the section indicators are indicated on the reels. For example, a game includes two section indicators designated by the letters A and B. Section indicator A is activated when two A symbols occur on the reels. Section indicator B is activated when three B symbols appear on the reels. The gaming device spins the reels and two A symbols are indicated or occur on the reels. Thus, the gaming device activates section indicator A in the game.

In a further aspect of this embodiment, the section indicators include different colors such as red, blue and green. It should be appreciated that the section indicators may include any suitable color or combination of colors in a game. It should also be appreciated that the section indicators may be designated by colors, numbers, characters, symbols, images or any suitable designator. In this embodiment, each section indicator includes a different color and the reels include activator symbols including each of the different colors. Thus, one or more of the section indicators are activated when one or more of the colors or activator symbols including the colors corresponding to the section indicators are indicated on the reels as described above. It should be appreciated that the section indicators may be activated based on a combination of one or more symbols including the same color or different colors in a game.

In a further embodiment, the reels include a plurality of symbols and are designated by one or more colors corresponding to the colors associated with each of the section indicators in a game. In this embodiment, the gaming device activates a section indicator when one or more activator symbols occur on the reel including the color associated with the section indicator. For example, the section indicator including the color red is activated when one or more designated activator symbols occur on the reel including the color red. It should be appreciated that one or more reels may be employed in a game and the reels may include one or more colors or color combinations as desired by the game implementor.

In another embodiment, one or more puzzles are associated with the section indicators. The gaming device enables a player to solve or complete the puzzle or puzzles to activate one or more of the section indicators. In one aspect of this embodiment, one puzzle is associated with each of the section indicators in a game. The gaming device activates one or more of the section indicators when the player solves or completes the puzzle or puzzles associated with those section indicators. In another aspect of this embodiment, a single puzzle including one or more components is associated with all of the section indicators in a game. Specifically, one or more of the components in the puzzle are associated with each of the section indicators. Therefore, the gaming device activates the section indicators based on the specific component or components that are solved or completed by the player in the puzzle.

In a further embodiment, the sequences described above are employed in a persistence game. In this embodiment, the gaming device enables the player to pick symbols in one or more of the sequences in the game to activate at least one of the section indicators in the game. Any symbols picked by the player remain displayed or indicated in the sequences for a designated number of games. Therefore, a player may complete a sequence in a single game or in a plurality of games. Similarly, one player may initially reveal some of the symbols in the sequences in one game and a subsequent player or players may complete or solve one or more of the sequences in a subsequent game or games. It should be appreciated that the designated number of games may be randomly determined, predetermined, determined based on a wager by a player or according to any suitable determination method. It should also be appreciated that the picked symbols in the sequences may remain revealed or displayed to the players until one or more of the sequences are completed.

Figure 8A:
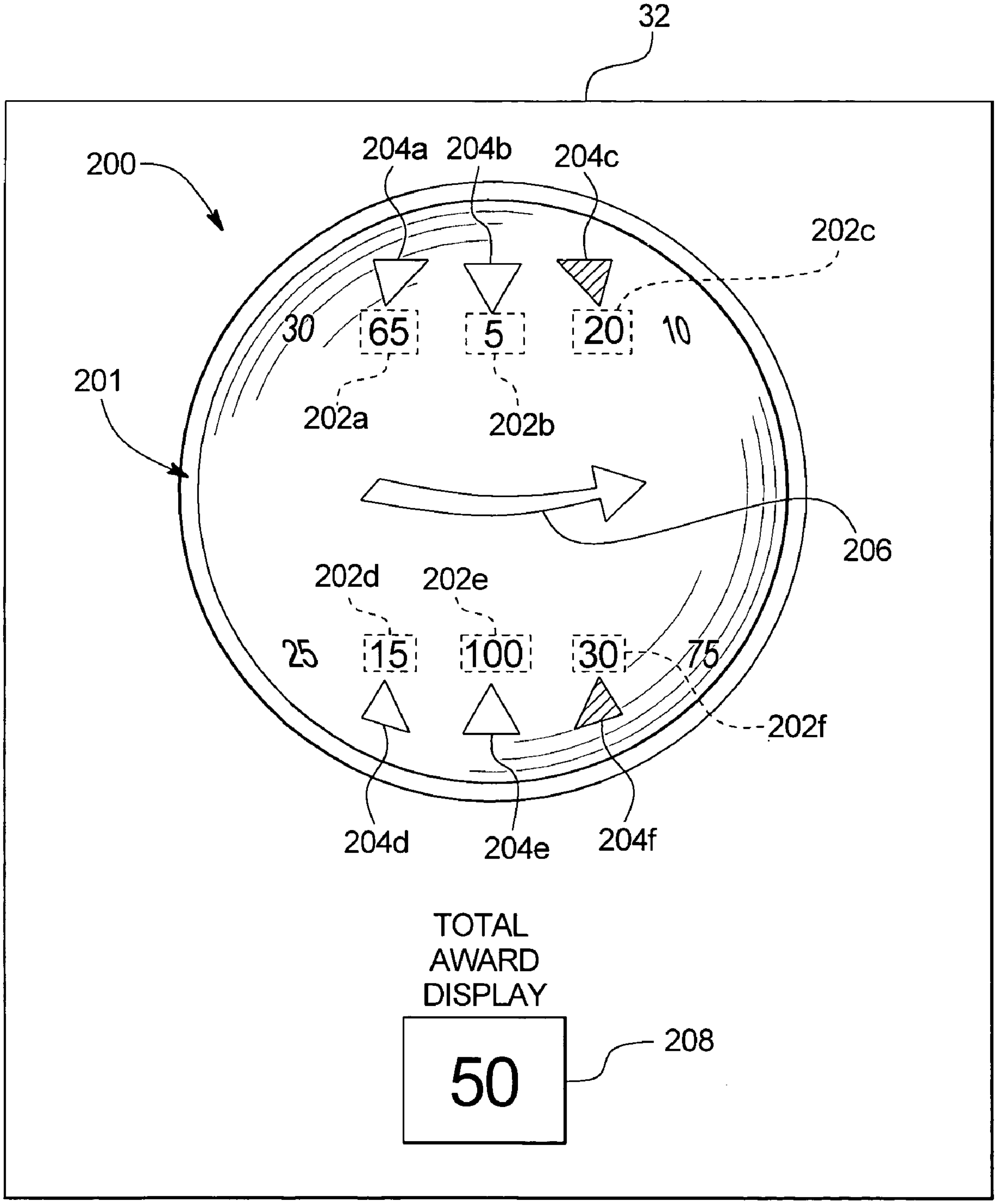
FIG. 8A is an enlarged front elevation view of one of the display devices of FIGS. 1A and 1B illustrating an alternative embodiment of the present invention.

Referring now to FIG. 8A, an alternative embodiment of the present invention is illustrated where the gaming device includes an award indicator or display 200 having a plurality of first award symbols 202*a*, 202*b* and 202*c*, which are positioned near the top or upper portion of the award indicator 200, and a plurality of second award symbols 202*d*, 202*e* and 202*f*, which are positioned near the bottom or lower portion of the award indicator 200. The gaming device also includes, a plurality of activatable first symbol indicators 204*a*, 204*b* and 204*c*, which are positioned adjacent to and indicate one or more of the first award symbols 202*a*, 202*b* and 202*c*, respectively, and a plurality of activatable second symbol indicators 204*d*, 204*e* and 204*f* which are positioned adjacent to and indicate one or more of the second award symbols 202*d*, 202*e* and 202*f*, respectively.

In one embodiment of the present invention, the gaming device or player picks one of the first symbol indicators 204*a*, 204*b* and 204*c* and one of the symbol indicators 204*d*, 204*e* and 204*f* to indicate award symbols in the game. The selected first and second symbol indicators are illuminated, highlighted or otherwise activated and the gaming device then moves or rotates the award indicator 200. Once the award indicator or display 200 stops moving or rotating, the activated or highlighted symbol indicators indicate award symbols on the award indicator, which correspond to those indicators. The award or awards associated with the indicated award symbols 202 are combined (such as being summed or multiplied together) and provided to the player as a total award in the game.

In one embodiment, the award indicator or display 200 is in the form of a mechanical sphere or ball which is positioned inside a receptacle or opening 201 formed in a housing such as display device 32 where the award indicator 200 is rotatably connected to the housing. In one embodiment, the housing is attached to the top of the cabinet of the gaming device 10. In another embodiment, the housing is separate from the cabinet and viewable by the player. The award indicator 200 is positioned and connected to the cabinet so that there is enough space or clearance between the award indicator and the housing to enable the award indicator to rotate within the housing. The award indicator is also positioned so that at least a portion of the award indicator is viewable by a player. In one embodiment, the award indicator 200 rotates from the left to the right as shown by arrow 206. In another embodiment, the award indicator rotates from the right to the left. It should be appreciated that the award indicator may rotate in any suitable direction or combination of directions. In one embodiment, the shape and size of the award indicator 200 is based on the theme or themes associated with the gaming device. It should also be appreciated that the award indicator may be any suitable size or shape, or based on any suitable theme or themes associated with a game. In one embodiment, the award indicator 200 is manufactured using a durable material such as suitable plastic. It should be appreciated that the award indicator may be manufactured using any suitable material.

In one embodiment, the award symbols 202*a*, 202*b*, 202*c*, 202*d*, 202*e* and 202*f* are separate symbols which are attached to the surface of the award indicator or display 200. In another embodiment, the award symbols are video symbols which are displayed on the award indicator. It should be appreciated that the award symbols 202 may be letters, numbers, characters, images or any suitable types of symbol or symbols. In this embodiment, the first and second award symbols 202*a* and 202*b* are laterally spaced apart on the award indicator to correspond with the lateral spacing of the symbol indicators 204. As shown in FIG. 8A, the first and second award symbols extend around the surface of the award indicator 200. It should be appreciated that one or a plurality of award symbols may be included on the award indicator. Additionally, it should be appreciated that the award symbols may be placed on one position or area of the award indicator or at any suitable position or positions on the award indicator.

In one embodiment, a plurality of first awards are associated with the first award symbols such as first award symbols 202*a*, 202*b* and 202*c*, and a plurality of second awards are associated with the plurality of second awards symbols such as 202*d*, 202*e* and 202*f*. In this embodiment, the awards are award values such as the values sixty-five, five and twenty or fifteen, one hundred and thirty. It should be appreciated that the awards may be values, prizes, modifiers, free spins, free games, game elements or any other suitable type of awards. In one embodiment, at least one of the first and second awards are the same. In another embodiment, a plurality of the first and second awards are the same. In a further embodiment, all of the first and second awards are the same. In another embodiment, all of the first and second awards are different.

In one embodiment, the first symbol indicators 204*a*, 204*b* and 204*c* are each in the form of an arrow which points generally downward towards the first award symbols 202*a*, 202*b* and 202*c*. It should be appreciated that the first symbol indicators may be any suitable size or shape or pointed in any suitable direction to indicate the first award symbols on the award indicator. In one embodiment, the gaming device enables a player to pick at least one of the first symbol indicators 204*a*, 204*b*, and 204*c* to activate or highlight the picked first symbol indicator or indicators in a game. In one embodiment, the gaming device enables the player to physically touch or press the symbol indicators to activate the symbol indicators in the game. In another embodiment, the gaming device includes at least one input or selector such as a button which enables the player to pick and activate one or more of the symbol indicators in the game. For example, when a player picks the first symbol indicator 204*b*, the symbol indicator 204*b* is highlighted or otherwise illuminated to show that the symbol indicator was selected and activated in the game. The award indicator or display 200 is moved or rotated and the activated symbol indicator 204*b* indicates an award symbol 202*b* in the game. It should be appreciated that the symbol indicators may be randomly activated, activated based on a wager by the player, activated when a player picks one of the symbol indicators or activated according to any suitable method.

In one embodiment, another set of activatable symbol indicators such as the second symbol indicators 204*d*, 204*e* and 204*f* are positioned near the bottom or lower portion of the award indicator 200 and indicate one or more of the second award symbols 202*d*, 202*e* and 202*f*. In this embodiment, the second symbol indicators 204*d*, 204*e* and 204*f* are each in the form of arrows and point generally upward towards one of the first award symbols. It should be appreciated that the second symbol indicators may be any suitable size or shape. Similar to the first symbol indicators described above, in one embodiment, the gaming device enables a player to pick one or more of the second symbol indicators 204*d*, 204*e* and 204*f* to activate or highlight the second symbol indicators and indicate one or more of the second award symbols. It should be appreciated that the player may touch the symbol indicator, press one of a plurality of inputs associated with the symbol indicators or use any other suitable type of input or selector as described above to select and activate the second symbol indicators 204*d*, 204*e* and 204*f*. It should be also appreciated that any suitable number of first and/or second symbol indicators may be selected and activated in a game or games.

Additionally, in one embodiment, the gaming device includes a total award display 208 which indicates the total value of the award or awards accumulated by the player in a game or games. It should be appreciated that the gaming device may include any suitable display or displays in a game.

Figure 8B:
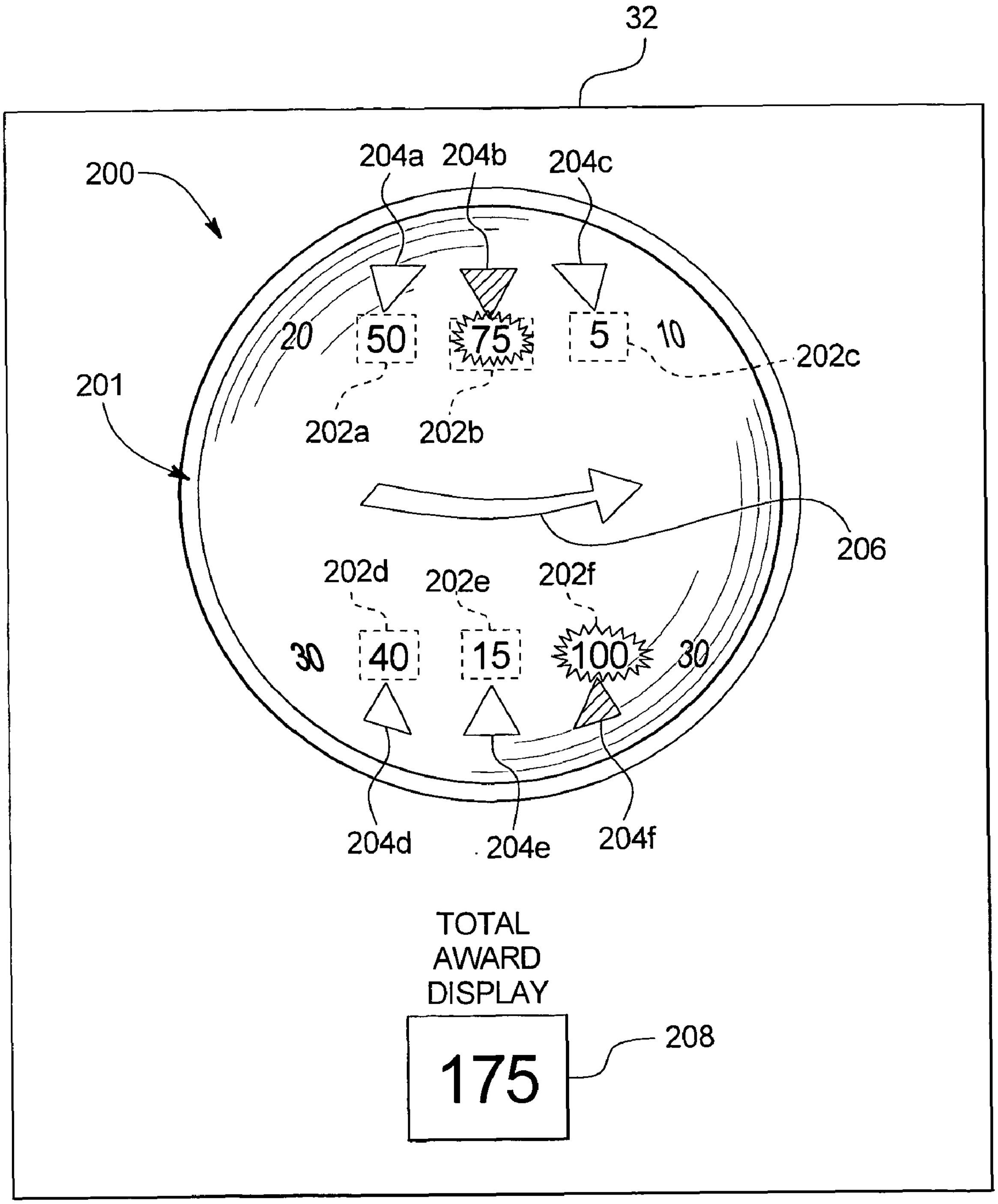
FIG. 8B is an enlarged front elevation view illustrating an example of the embodiment of FIG. 8A.

Referring now to FIG. 8B, an example of the embodiment of FIG. 8A is illustrated. In this example, when the bonus game is triggered, the gaming device enables a player to pick and activate one of the first symbol indicators 204*a*, 204*b* and 204*c* and pick and activate one of the second symbol indicators 204*d*, 204*e* and 204*f*. The player picks first symbol indicator 204*b* and second symbol indicator 204*f*, which activates or highlights the selected first and second symbol indicators 204*b* and 204*f* in the game. The gaming device then spins or rotates the award indicator 200 in the direction shown by arrow 206. Once the award indicator 200 stops spinning, the activated first and second symbol indicators 204*b* and 204*f* (i.e., the symbol indicators picked by the player) indicate one of the first award symbols 202*a* and one of the second award symbols 202*b* on the award indicator 200. Specifically, in this example, the activated first symbol indicator 204*b* indicates a first award symbol 202*b* including an associated first award of seventy-five and the activated second symbol indicator 204*f* indicates a second award symbol 202*f* including an associated second award of one hundred. In this embodiment, the first and second awards of seventy-five and one hundred, respectively, which are associated with the indicated first and second award symbols, are added or summed together to provide the player with a total award of one hundred seventy-five as indicated by the total award display 208.

In another embodiment, the first and second awards associated with the indicated first and second award symbols are modified and then provided to the player. For example, the first award of seventy-five is multiplied by the second award of one hundred to provide the player with a total award of seven thousand five hundred for the game. It should be appreciated that the awards associated with the indicated award symbols may be modified or otherwise combined in any suitable manner desired by the game implementor.

Figure 8C:
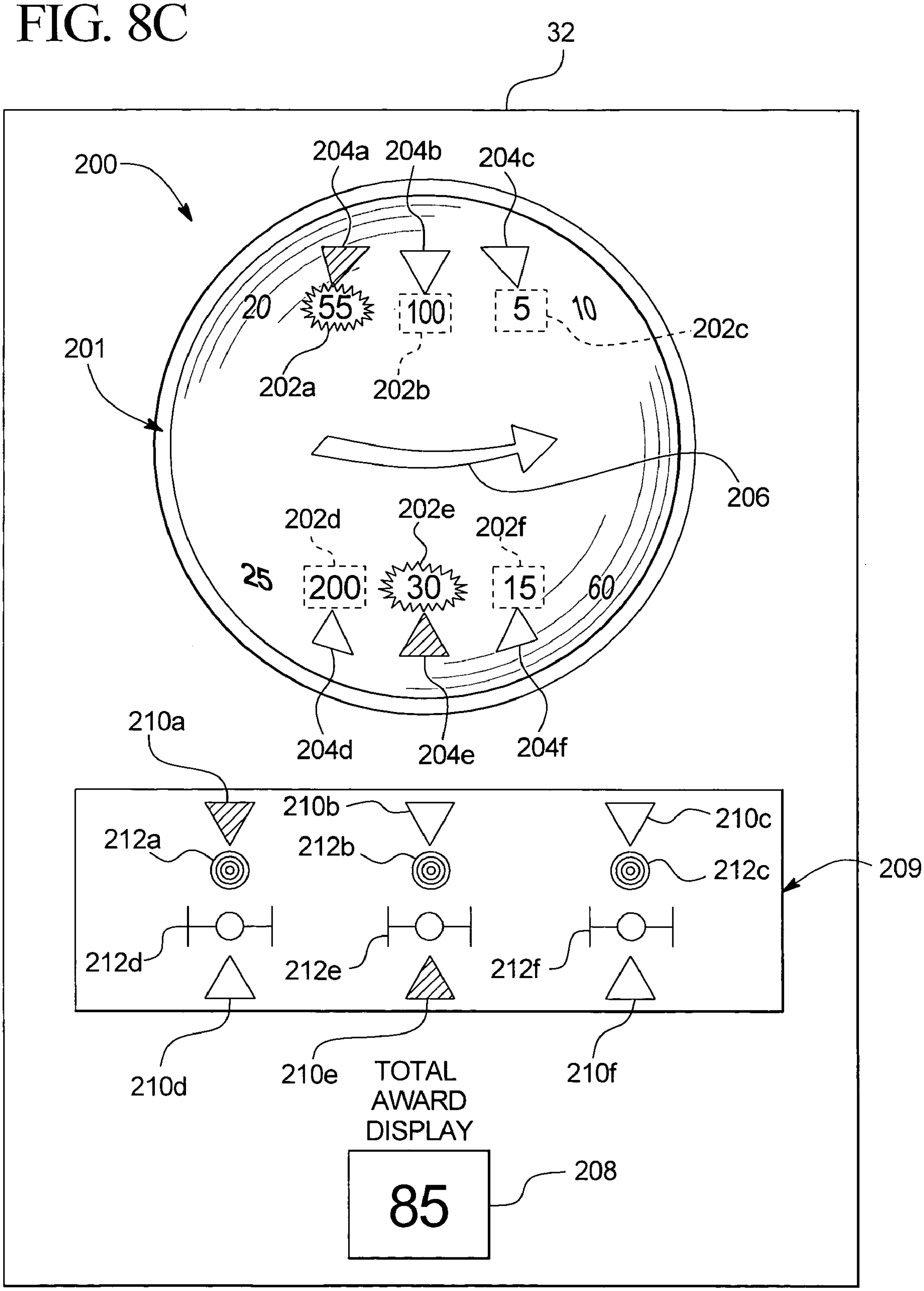
FIG. 8C is an enlarged front elevation view illustrating another alternative embodiment of the present invention where the gaming device includes a selection display which enables a player to pick and activate the symbol indicators in a game.

Referring now to FIG. 8C, another alternative embodiment of the present invention is illustrated where the embodiment of FIG. 8A further includes a selection display 209 which enables a player to select and activate at least one of the first symbol indicators 204*a*, 204*b* and 204*c* and the second symbol indicators 204*d*, 204*e* and 204*f*. In this embodiment, the selection display 209 is a video display which includes a plurality of player selectable inputs such as a plurality of first inputs 212*a*, 212*b* and 212*c* in a plurality of second inputs 212*d*, 212*e* and 212*f*. The gaming device enables a player to press or activate at least one of the first inputs and at least one of the second inputs to highlight a corresponding activator symbol 210*a*, 210*b* and 210*c* and a corresponding second activator symbol 210*d*, 210*e* and 210*f*. The highlighted or illuminated activator symbols activate the corresponding symbol indicators 204*a*, 204*b*, 204*c*, 204*d*, 204*e* and 204*f* on the award indicator 200.

For example in FIG. 8C, the selection display 209 displays a plurality of first inputs such as the target symbols 212*a*, 212*b* and 212*c* and a plurality of second inputs such as the spaceships 212*d*, 212*e* and 212*f*. It should be appreciated that the inputs may be any suitable symbols or images, or associated with any suitable theme or themes associated with a game. The player first picks one of the second inputs 212*d*, 212*e* or 212*f* to highlight or illuminate one of the corresponding second activators 210*d*, 210*e* and 210*f*. In this example, the player picks the second input 212*e* which highlights or illuminates the second activator 210*e*. Therefore, the corresponding symbol indicator 204*e* is activated or highlighted on the award indicator 200 as shown in FIG. 8C. Next, the player picks one of the first inputs or target symbols 212*a*, 212*b* or 212*c* to highlight or illuminate one of the first activators 210*a*, 210*b* or 210*c*. In this example, the player picks target symbol 212*a* which highlights or illuminates first activator 210*a*. As a result, the corresponding symbol indicator 204*a* is activated or highlighted on the award indicator 200. The gaming device then rotates or spins the award indicator 200 and the activated first symbol indicator indicates an award symbol 202*a* having an award of fifty-five and the activated second symbol indicator 204*e* indicates an award symbol 202*e* having an award of thirty. The gaming device adds the first and second awards together to provide a total award of eighty-five to the player as indicated by the total award display 208. It should be appreciated that any suitable inputs, buttons or other activation devices may be employed in a game to select one or more of the symbol indicators 204 on the award indicator 200 in the game.

Figure 9:
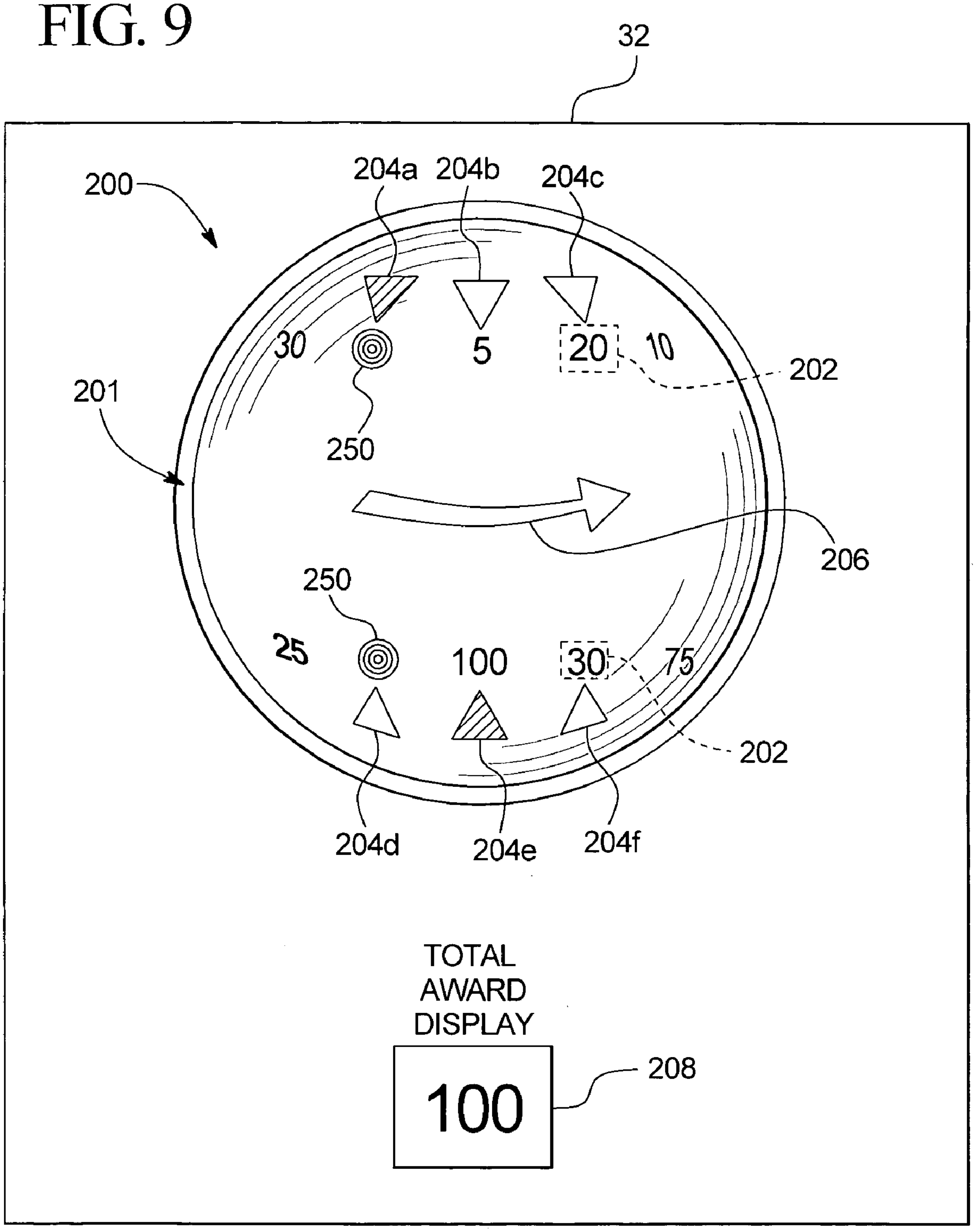
FIG. 9 is an enlarged front elevation view of one of the display devices of FIGS. 1A and 1B illustrating a further alternative embodiment of the present invention where the award symbols on the award indicator include bonus symbols.

Referring now to FIG. 9, a further alternative embodiment of the present invention is illustrated where the first and second award symbols include at least one bonus symbol such as the target symbol 250. In this embodiment, each of the target symbols 250 is associated with at least one free spin or free activation of the award indicator in the game. Therefore, if the player picks one of the symbol indicators 204*a*, 204*b*, 204*c*, 204*d*, 204*e* or 204*f* which indicates one of the target symbols 250, the gaming device provides the player with at least one free spin or free activation of the award indicator 200 in the game. This adds further excitement and enjoyment for the player because the player will obtain additional opportunities to obtain more awards in the game. It should be appreciated that the bonus symbols may be any suitable symbol or image desired by the game implementor. It also should be appreciated that the first and second award symbols may include one or more bonus symbols in a game. It should further be appreciated that the bonus symbols may provide one or more free spins or activations of the award indicator in a game.

As shown in FIG. 9, the player picked and activated first symbol indicator 204*a* and second symbol indicator 204*e* which indicate a target symbol 250 and an award symbol having an award of one hundred. The gaming device provides the player with the award of one hundred as indicated by the total award display 208 and at least one free spin or activation of the award indicator in the game. As a result, the player obtains additional opportunities to obtain more awards in the game.

Figure 10:
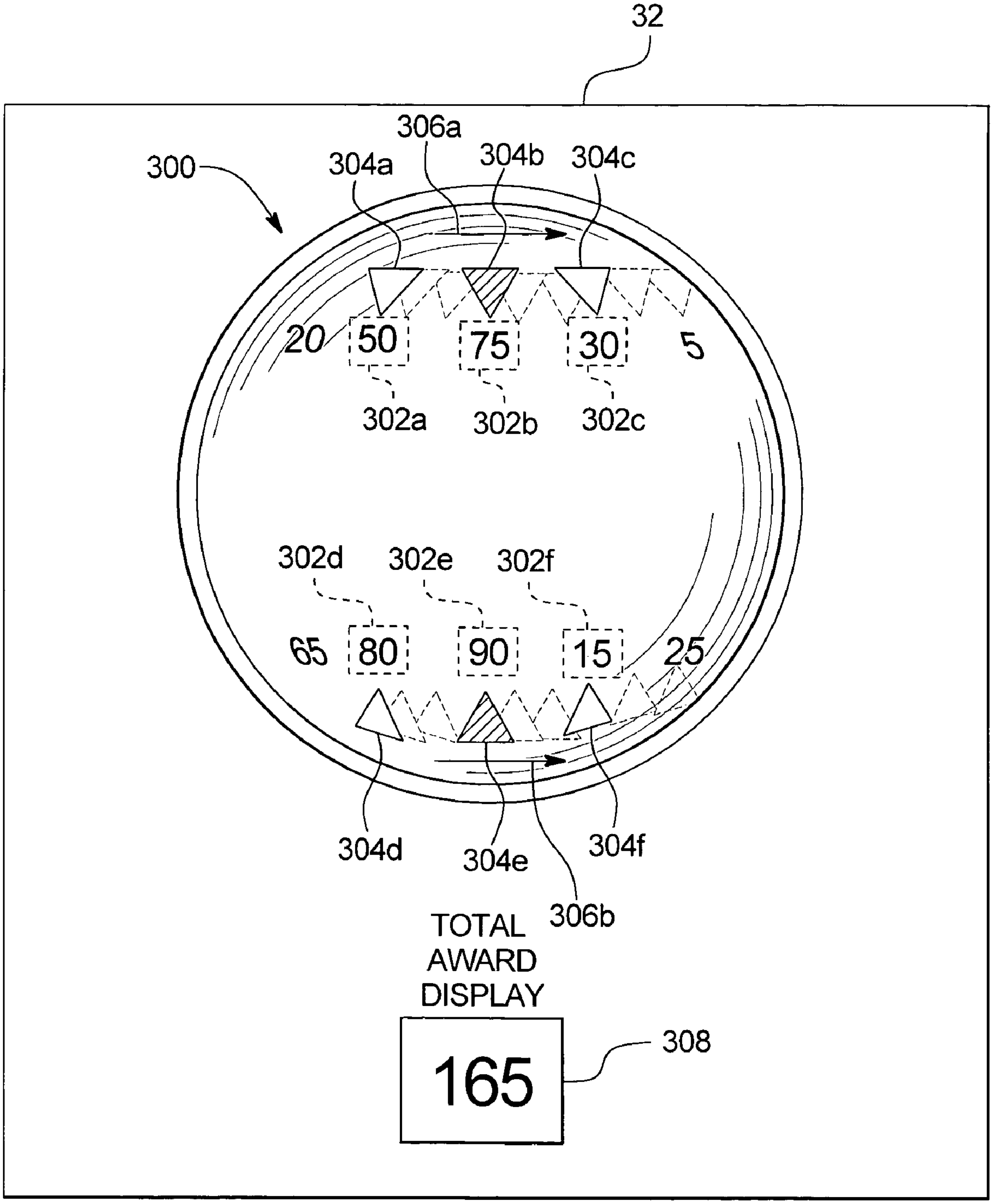
FIG. 10 is an enlarged front elevation view of one of the display devices of FIGS. 1A and 1B illustrating another alternative embodiment of the present invention where the award indicator includes movable symbol indicators.

Referring now to FIG. 10, another alternative embodiment of the present invention is illustrated where the first symbol indicators 304*a*, 304*b* and 304*c* and the second symbol indicators 304*d*, 304*e* and 304*f* move relative to the award indicator 300. In this embodiment, the award indicator 300 remains stationary while the first and second symbol indicators move or rotate from the left to the right as indicated by arrows 306*a* and 306*b* to indicate one or more of the first and second award symbols 302*a*, 302*b*, 302*c* and 302*d*, 302*e* and 302*f*, respectively, included on the award indicator. In another embodiment, the first and second symbol indicators rotate from the right to the left while the award indicator 300 remains stationary. In one embodiment, the first symbol indicators 304*a*, 304*b* and 304*c* move in the same direction as the second symbol indicators 304*d*, 304*e* and 304*f*. In another embodiment, the first symbol indicators move in a different direction from the second symbol indicators. It should be appreciated that the first and second symbol indicators may move in the same direction, different directions or any suitable combination of directions as desired by the game implementor.

In one embodiment of the present invention, the gaming device or player picks and activates one or more of the first symbol indicators 304*a*, 304*b* and 304*c* and one or more of the second symbol indicators 304*d*, 304*e* and 304*f*. The gaming device then rotates the symbol indicators relative to the award indicator. Once the symbol indicators stop moving or rotating, the activated first and second symbol indicators indicate corresponding first and second award symbols on the award indicator 300. The first and second awards associated with the indicated first and second award symbols are summed, multiplied or otherwise modified as described above and provided to the player as a total award in the game. The total award is indicated by the total award display 308 as shown in FIG. 10.

Figure 11:
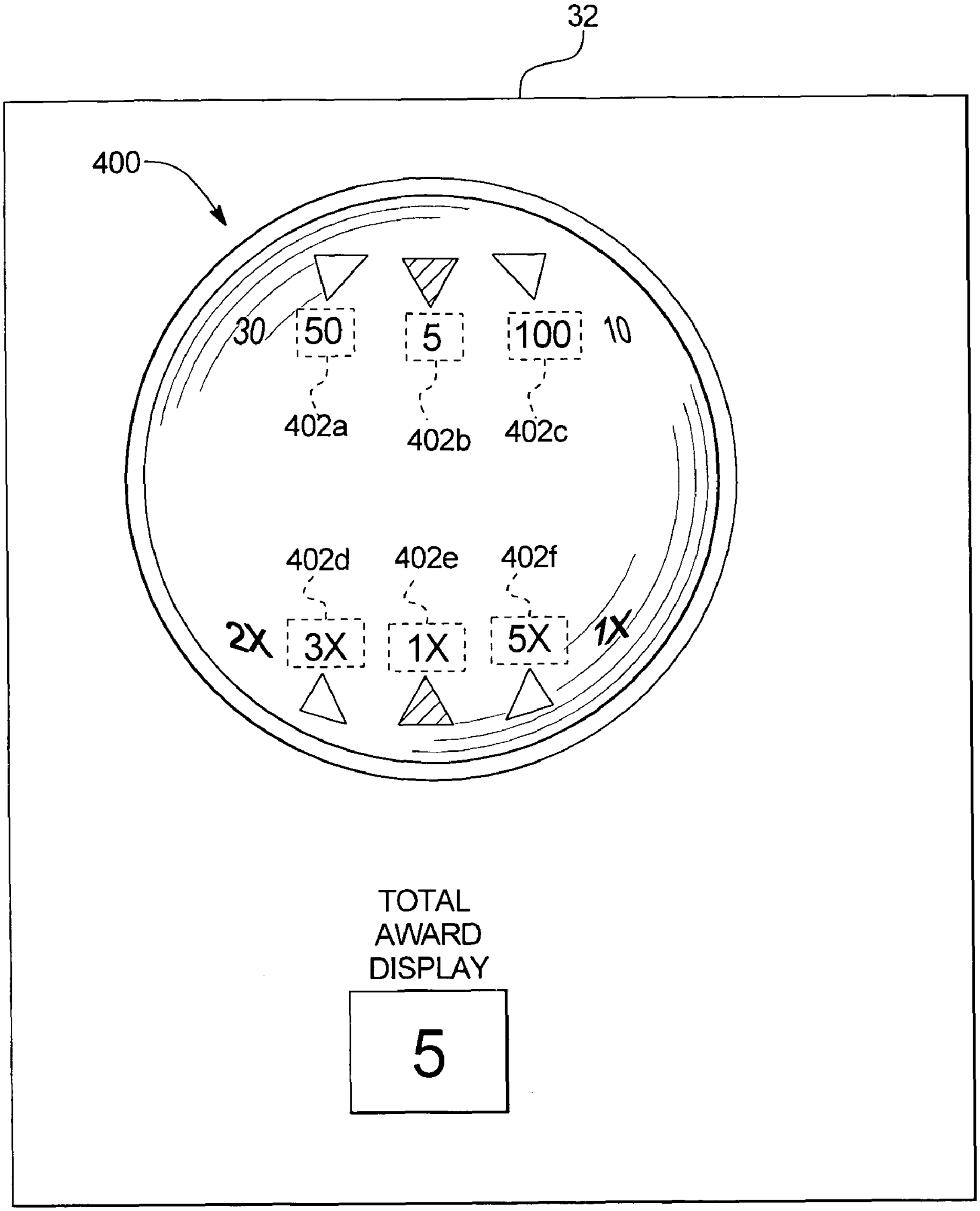
FIG. 11 is an enlarged front elevation view of one of the display devices of FIGS. 1A and 1B illustrating a further alternative embodiment of the present invention where different award symbols are included on the award indicator.

Referring now to FIG. 11, a further alternative embodiment of the present invention is illustrated where the award indicator 400 includes a plurality of first award symbols 402*a*, 402*b* and 402*c* and a plurality of second award symbols 402*d*, 402*e* and 402*f*. In this embodiment, the first awards associated with the first award symbols are different from the second awards associated with the second award symbols. As shown in FIG. 11, the first awards associated with the first awards symbols include values such as the values fifty, five and one hundred. The second awards associated with the second awards symbols include modifiers such as multipliers of 3×, 1× and 5×. In one embodiment, at least one of the first and second awards associated with the first and second award symbols are the same. In another embodiment, a plurality of the first and second awards associated with the first and second award symbols are the same. In a further embodiment, all the first and second awards associated with the first and second award symbols are the same. In another embodiment, all of the first and second awards associated with the first and second award symbols are different. It should be appreciated that the first and second awards may include any suitable awards, prizes, free spins, free games, game elements or any other suitable types of awards.

Figure 12:
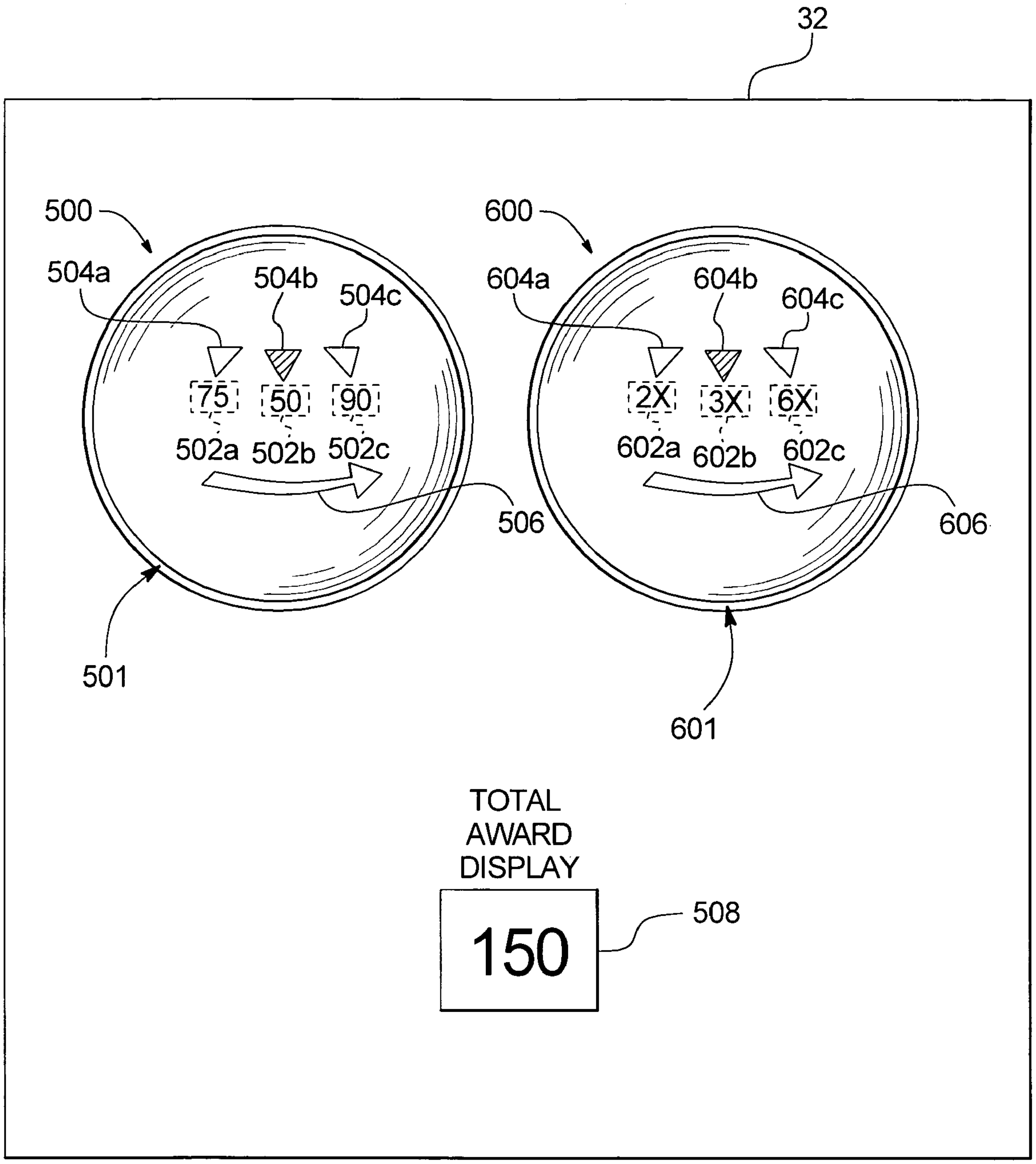
FIG. 12 is an enlarged front elevation view of one of the display devices of FIGS. 1A and 1B illustrating another alternative embodiment of the present invention including a plurality of award indicators.

Referring now to FIG. 12, another alternative embodiment of the present invention is illustrated where the gaming device includes a plurality of award indicators such as the award indicators 500 and 600. In this embodiment, the gaming device displays the two award indicators 500 and 600 to the player on the same housing such as display device 32. It should be appreciated that the award indicators 500 and 600 may be displayed on the same display device or housing or on different display devices or housings. The award indicators 500 and 600 are positioned in the openings 501 and 601 defined by the display device 32. The opening 501 and 601 are formed to allow enough clearance between the award indicators and the display device to enable the award indicators to move (i.e. rotate) within the display device. It should be appreciated that any suitable number of award indicators may be employed in a game. Additionally, the display devices may be connected or otherwise attached to the cabinet of the gaming device or separate display devices which are in communication with the processor in the gaming device.

As shown in FIG. 12, the first award indicator 500 includes a plurality of award symbols 502*a*, 502*b* and 502*c* and a plurality of activatable symbol indicators 504*a*, 504*b* and 504*c* which are positioned adjacent to the award symbols. Similarly, the second award indicator 600 includes a plurality of award symbols 602*a*, 602*b* and 602*c* and a plurality of activatable symbol indicators 604*a*, 604*b* and 604*c*. In one embodiment, the gaming device or player selects and activates one of the symbol indicators 504 and one of the symbol indicators 604 to indicate one of the award symbols 502 and one of the award symbols 602, respectively, in a game. The award indicator 500 rotates from the left to the right as shown by arrow 506 and the award indicator 600 rotates from the left to the right as shown by arrow 606. In this embodiment, the award indicators 500 and 600 move or rotate in the same direction. It should be appreciated, however, that the award indicators may rotate in the same direction, different directions or any combination of directions as desired by the game implementor.

Additionally, different awards are associated with the award symbols 502 and 602. The awards associated with the award symbols 502 are values such as values seventy-five, fifty and ninety. The awards associated with the award symbols 602 are modifiers such as multipliers of 2×, 3× and 6×. In this embodiment, the gaming device or player selects and activates one of the symbol indicators 504 and 604 on the respective award indicators 500 and 600 in a game to indicate one of the award symbols 502 and one of the award symbols 602 in the game. The awards associated with the indicated award symbols on the award indicators 500 and 600 are combined and provided to the player as indicated by the total award display 508.

In one example, a player picks symbol indicators 504*b* and 604*b* to be activated in a game. The gaming device highlights or illuminates the activated symbol indicators on each of the award indicators. The gaming device then moves or spins the award indicators. When the award indicators stop spinning, the activated symbol indicators indicate an award symbol 502*b* having an associated award of fifty and an award indicator 602*b* having an award of 3×. The award of fifty is multiplied by the multiplier of 3× to provide the player with a total award of one hundred fifty as indicated by the total award display 508. It should be appreciated that the awards associated with the award symbols on the plurality of award indicators may be any suitable awards, prizes, modifiers, free spins, free games, game elements or any other suitable awards. Additionally, the awards associated with the indicated award symbols in a game may be combined in any suitable manner desired by the game implementor as described above.

Figure 13:
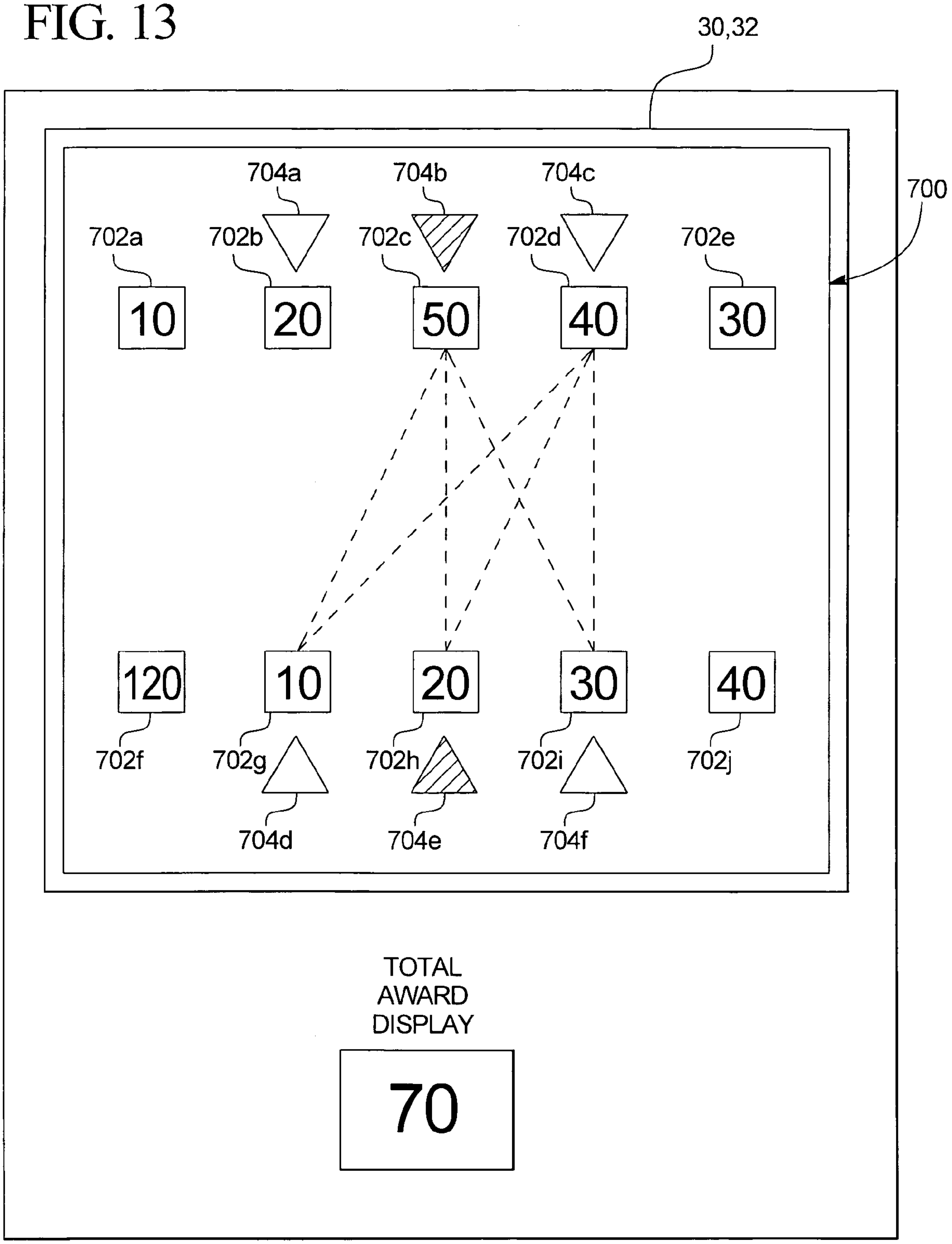
FIG. 13 is an enlarged elevation view of one of the display devices of FIGS. 1A and 1B illustrating a further alternative embodiment of the present invention.

Referring to FIG. 13, in another alternative embodiment, the first and second award symbols can be related to each other in a game or games in any suitable manner desired by the game implementor. In the illustrated example, an award indicator 700 including first and second award symbols 702*a*, 702*b*, 702*c*, 702*d*, 702*e*, 702*f*, 702*g*, 702*h*, 702*i* and 702*j* is displayed on a video display device such as display devices 30 or 32. Certain of the first and second award symbols are arranged or positioned on the award indicator 700 in this example such that the average expected award provided to the player (i.e, the combination of the first and second awards associated with indicated first and second award symbols) is approximately the same in a game.

For example, as illustrated in FIG. 13, the average expected award or average total award provided to the player when the first award symbol 702*c* is indicated in a game is seventy when a certain configuration on the award display occurs. Specifically, the first award associated with the first award symbol 702*c* is fifty. As shown by the dotted lines in FIG. 13, the first award symbol 702*c* may only be paired with one of the second award symbols 702*g*, 702*h* or 702*i* based on the fixed arrangement of the first and second award symbols on the award indicator. Therefore, when the first award symbol 702*c* is indicated in a game, the gaming device either provides a total award of sixty (the sum of the awards associated with first award symbol 702*c* and the second award symbol 704*g*), a total award of seventy (the sum of the awards associated with first award symbol 702*c* and the second award symbol 704*h*) or a total award of eighty (the sum of the awards associated with first award symbol 702*c* and the second award symbol 704*i*). Therefore, the average award or average total award provided to the player is seventy (i.e., [60+70+80]/3).

The average award or average total award provided to the player when the first award symbol 702*d* is indicated in a game is different in this illustrated embodiment. Specifically, the first award associated with the first award symbol 702*d* is forty. As shown by the dotted lines in FIG. 13, the first award symbol 702*d* may only be paired with one of the second award symbols 702*g*, 702*h* or 702*i*. Therefore, when the first award symbol 702*d* is indicated in a game, the gaming device either provides a total award of sixty (the sum of the awards associated with first award symbol 702*d* and the second award symbol 702*h*), a total award of seventy (the sum of the awards associated with first award symbol 702*d* and the second award symbol 702*i*) or a total award of fifty (the sum of the awards associated with first award symbol 702*d* and the second award symbol 702*g*). Therefore, the average award or average total award provided to the player when first award symbol 702*d* i2 indicated in the game is sixty (i.e., [60+70+50]/3). This illustrates how the average expected values can differ in one embodiment. It should also be appreciated that the average expected value of each activator symbol indicator can be the same or can vary. It should further be appreciated that each award can have the same or a different probability of being indicated by each symbol indicator.

In a further embodiment, the first and second award symbols are arranged on the award indicator so that the average expected award is different for one or more indications of the first and second award symbols in the game. For example, the first and second awards may be arranged on the award indicator so that all of the relatively larger awards are in one area of the award indicator and all of the relatively smaller awards are positioned in another area of the award indicator. Thus, the average expected award based on two of the relatively larger awards is different than (i.e., greater than) the average expected award based on two of the relatively smaller awards. It should be appreciated that none, a plurality or all of the average expected awards associated with the first and second awards of any indicated first and second award symbols arranged on the award indicator may be different.

Referring now to FIGS. 14A to 14D, in another embodiment of the present invention, in addition to the award generator or wheel 100 and the plurality of primary reels 34 as described above, the gaming device includes at least one award indicator activator symbol generator 802, such as an extra or secondary reel in mechanical or video form. In one alternative embodiment, the gaming device includes a plurality of award indicator activator symbol generators, such as a plurality of extra or secondary reels. Each award indicator activator symbol generator includes at least one and preferably a plurality of award indicator activator symbols, such as section indicator symbols. Each award indicator activator symbol is associated with zero, one or more of the award indicators which are associated with the award generator. In this example, each award indicator activator symbol is illustrated as a section indicator symbol which represents zero, one or more of the section indicators to be activated for one or more activations of the wheel.

Figure 14A:
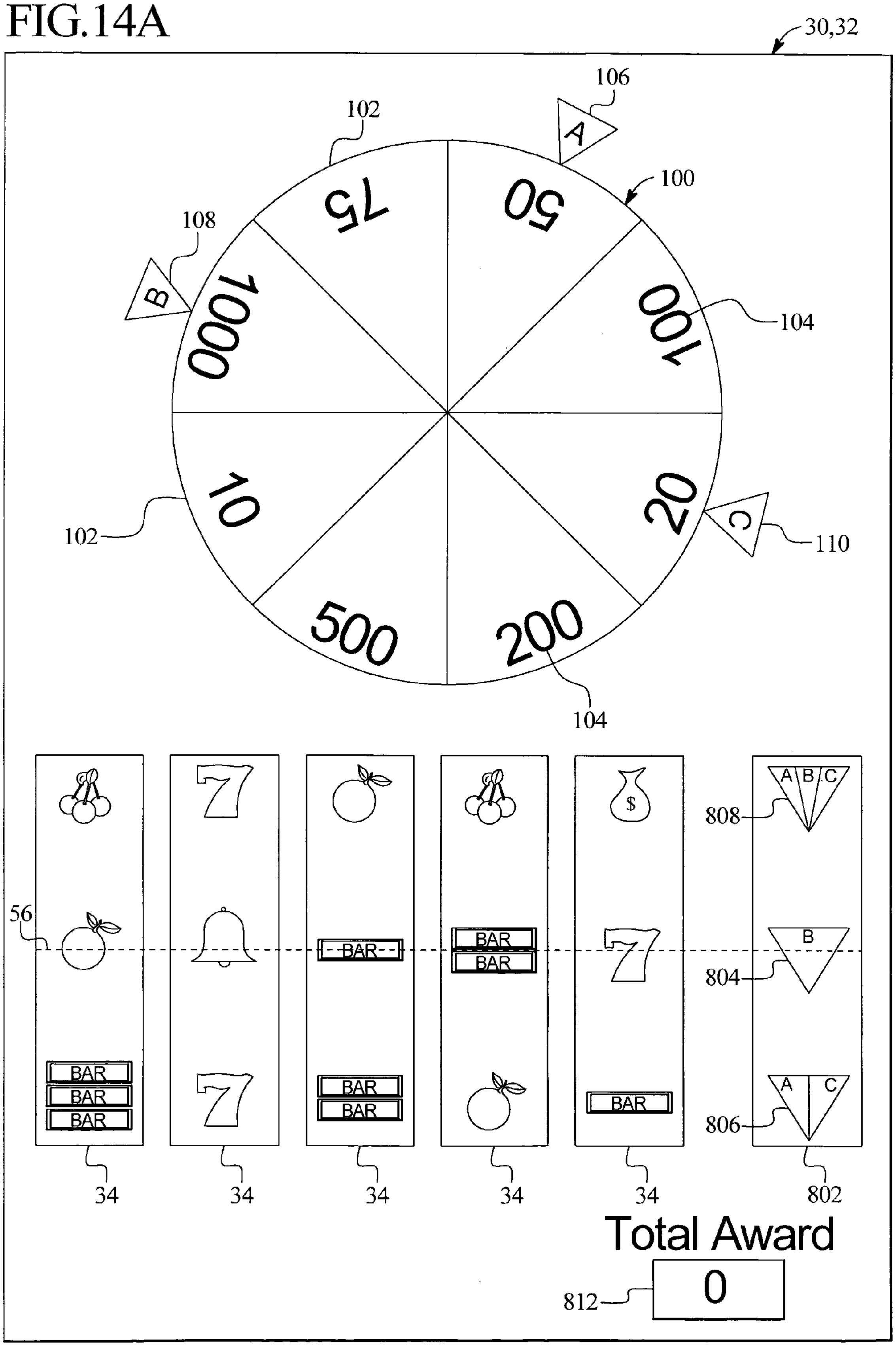
FIGS. 14A, 14B, 14C and 14D are front elevation views of one embodiment of the present invention illustrating a secondary reel operable to generate a section indicator symbol which is associated with one or more section indicators.

In one embodiment, one or more section indicator symbols are not associated with any section indicators of the wheel or other suitable award generator. In another embodiment, one or more section indicator symbols are each associated with one section indicator of the wheel or award generator. In another embodiment, one or more section indicator symbols are each associated with a plurality of section indicators of the wheel or award generator. In another embodiment, one or more section indicator symbols are each associated with each of the section indicators of the wheel or other suitable award generator. In this example, as seen in FIG. 14A, section indicator symbol 804 designated by the letter B is associated with section indicator 108 also designated by the letter B. Section indicator symbol 806 designated by the letters A and C is associated with section indicators 106 and 110 which are also designated by the letters A and C and section indicator symbol 808 designated by the letters A, B and C is associated with section indicators 106, 108 and 110 which are also designated by the letters A, B and C. It should be appreciated that while letters are used to designated the relationship between each section indicator symbol and each section indicator, other suitable characteristics, such as colors, numbers or images may be employed in accordance with the present invention.

Figure 14B:
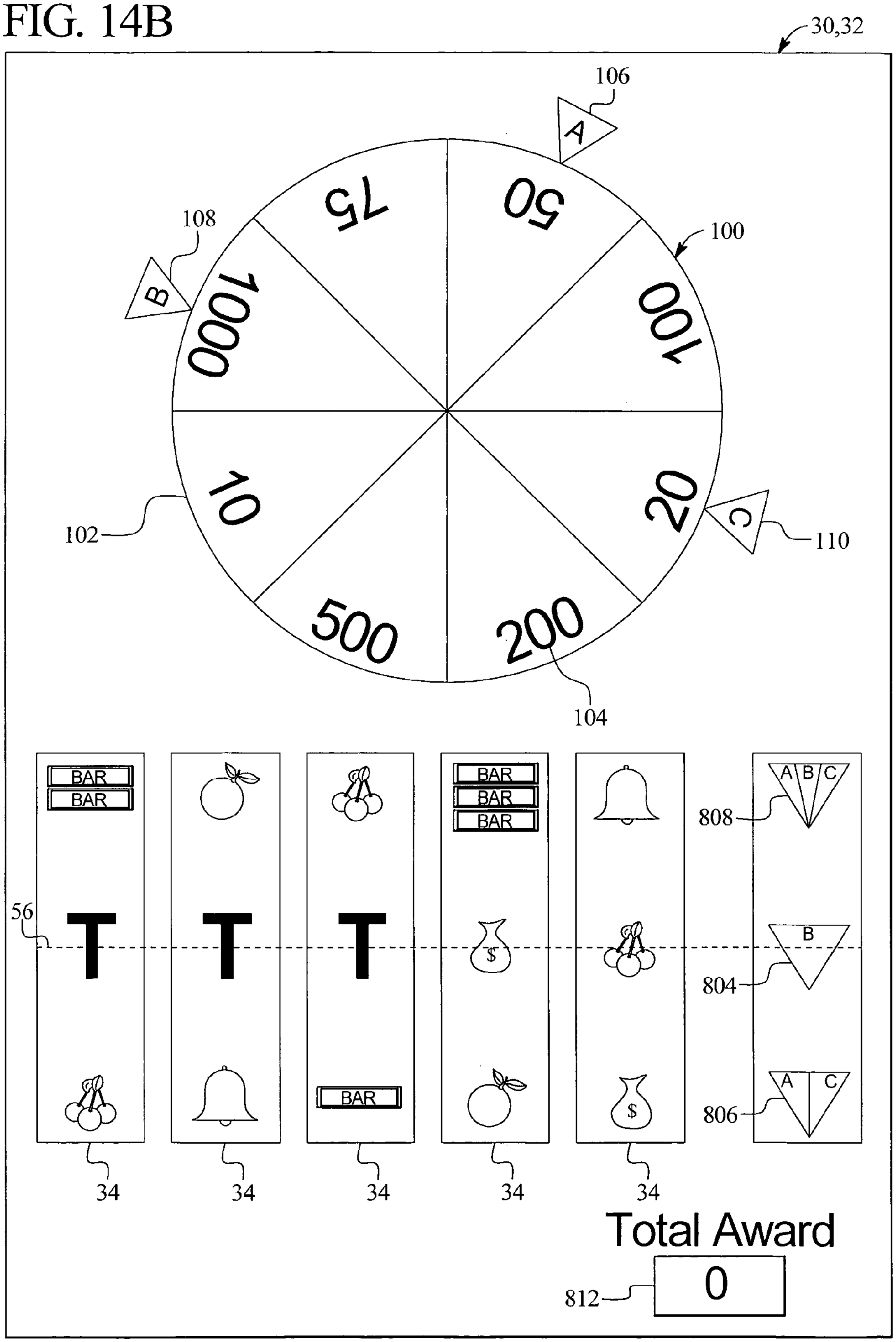

As seen in FIG. 14B, upon a suitable triggering event, such an appropriate wager, the primary reels are activated to spin. The primary reels spin to generate a plurality of symbols. If a predetermined event or condition occurs, such as the generation of a designated symbol or symbol combination on an active payline 56, the gaming device activates the award indicator activator symbol generator. In this case, as the predetermined condition of three "T" or triggering symbols generated on three adjacent reels occurred, the gaming device activates the award indicator activator symbol generator, illustrated in this case as the extra or secondary reel, to spin.

Figure 14C:
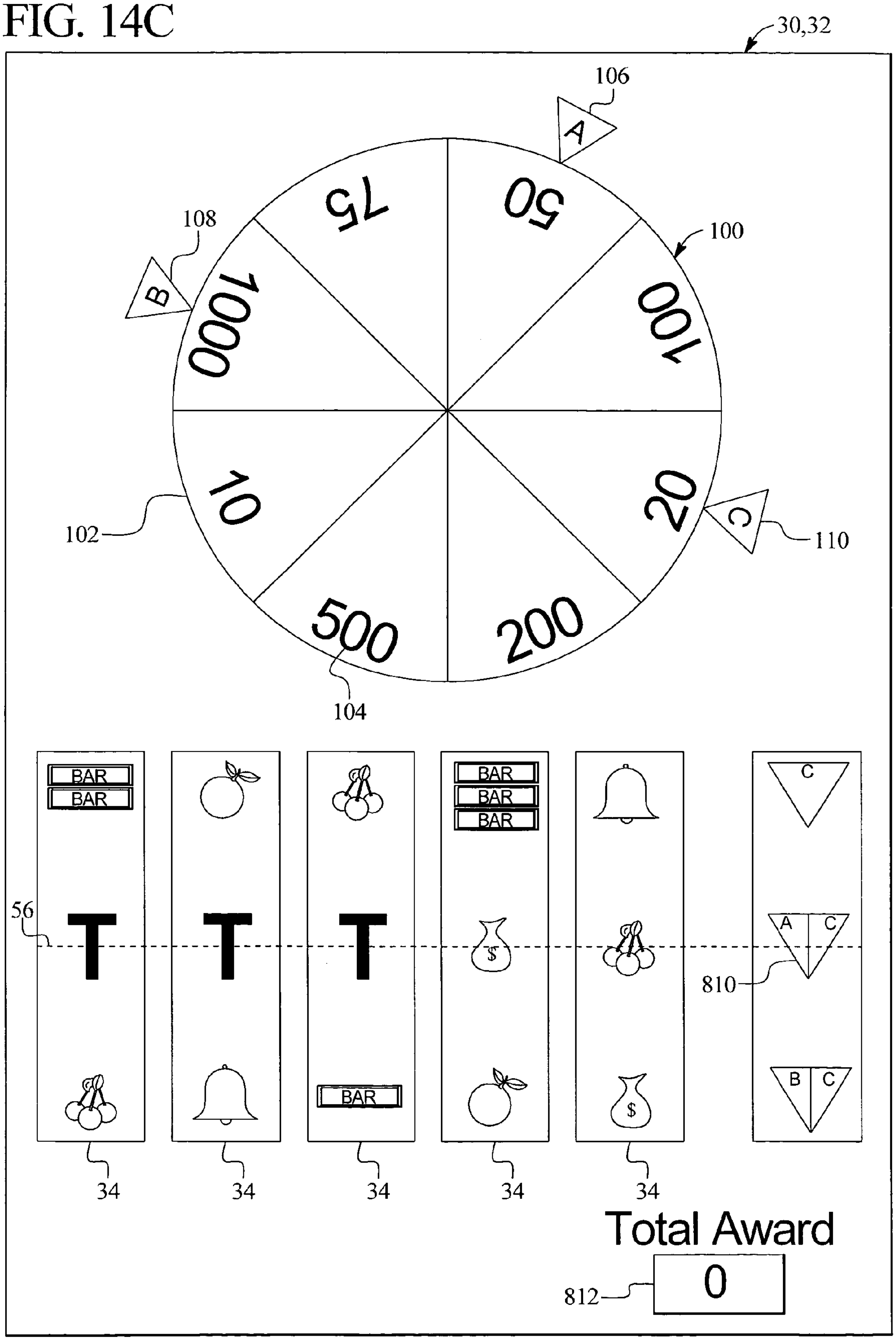

As seen in FIG. 14C, the extra reel spins to generate a section indicator symbol on the active payline. In this case, section indicator symbol 810 designated by the letters A and C is generated. The section indicator(s) associated with the generated section indicator symbol are activated for one or more spins or generations of the wheel or award generator. In this case, as section indicator symbol 810 is associated with section indicators 106 and 110, the gaming device activates section indicators 106 and 110 for one or more spins of the wheel or award generator.

In one embodiment, the extra wheel is activated after the occurrence of a suitable predetermined event or condition on the reels. In another embodiment, the extra reel is activated to generate a plurality of section indicator symbols simultaneously with each activation of the primary reels. In this embodiment, for each activation of the primary reels, the extra reel generates a section indicator symbol which is utilized if a predetermined event or condition occurs based on the primary reels. In another embodiment, the extra reel is activated prior to the activations of the primary reels. In this embodiment, if a suitable predetermined event or condition occurs based on the primary reels, the gaming device utilizes the section indicator symbol generated by the activated extra reel.

In one embodiment, the extra reel spins one time to generate one section indicator symbol. In another embodiment, the extra reel spins a plurality of times to generate a plurality of section indicator symbols. In these embodiments, the number of times the extra reel spins may be predetermined, randomly determined, determined based on the player's wager, determined based on the symbol combination that activated the extra reel or determined in any other suitable fashion. In one embodiment, if the extra reel spins a plurality of times to generate a plurality of section indicator symbols, the gaming device may activate one, more or each of the section indicator (s) associated with one, more or each of the generated section indicator symbols.

In one embodiment, the section indicator(s) associated with the generated section indicator symbol are activated for one spin of the wheel or award generator. In another embodiment, the section indicator(s) associated with the generated section indicator symbol are activated for a plurality of spins of the wheel or award generator. In other embodiments, the number of spins the section indicator(s) associated with the generated section indicator symbol are activated for is predetermined, randomly determined, determined based on the player's wager, determined based on the symbol combination that activated the extra reel or determined in any other suitable fashion.

Figure 14D:
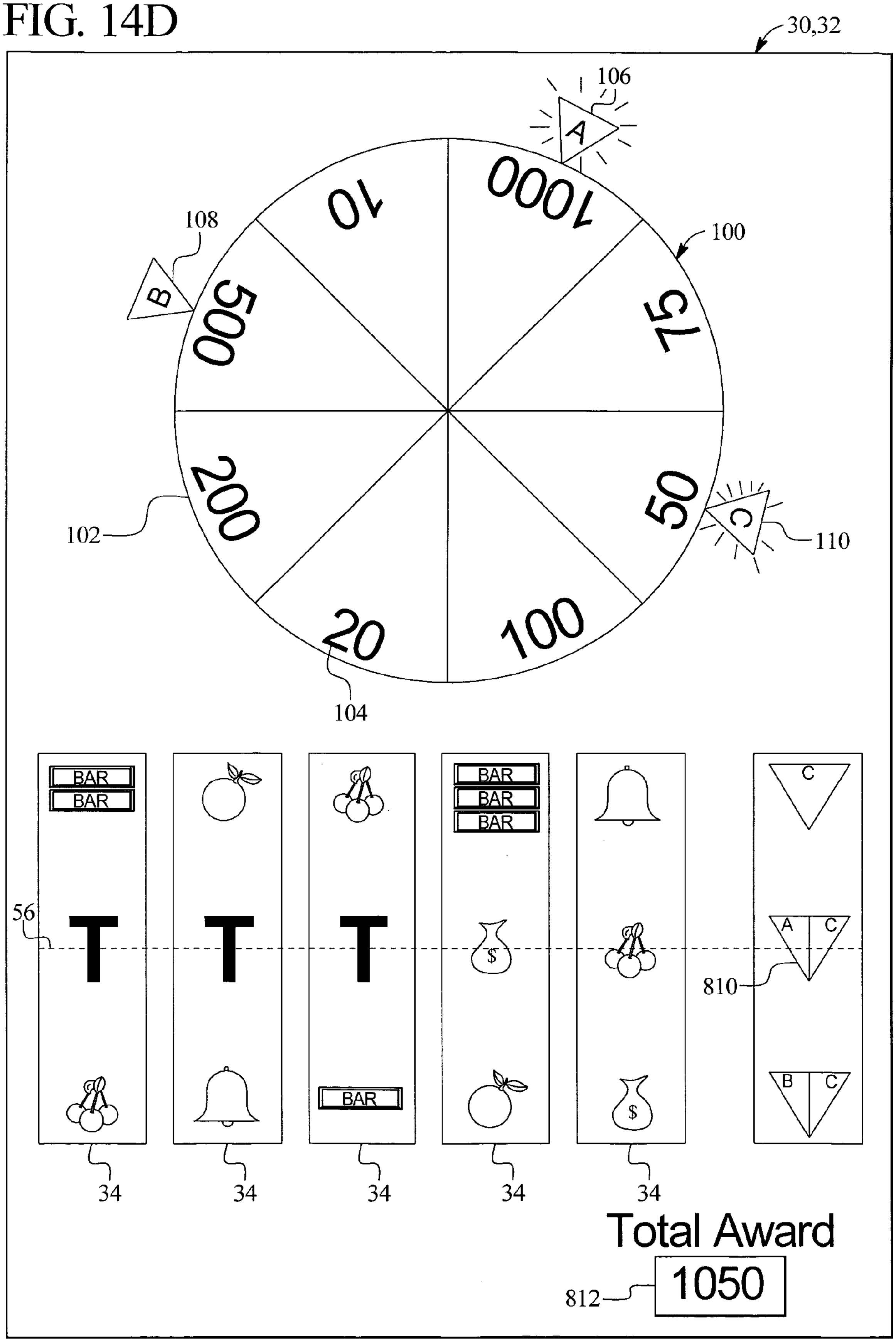

As seen in FIG. 14D, after at least one section indicator is activated based on the generated section indicator symbol, the gaming device activates the wheel or award generator to spin one or more times. The number of times the wheel spins may be predetermined, randomly determined, determined based on the player's wager or determined in any other suitable fashion. For each spin of the wheel, the award indicated by each activated section indicator is provided to the player. In this case, activated indicator 106 indicates an award of one-thousand and activated indicator 110 indicates an award of fifty. A total award is determined based on each of the indicated awards and displayed to the player in a total award display 812. The total award of one-thousand-fifty (the sum of the two indicated awards) is provided to the player and the game ends.

Figure 15A:
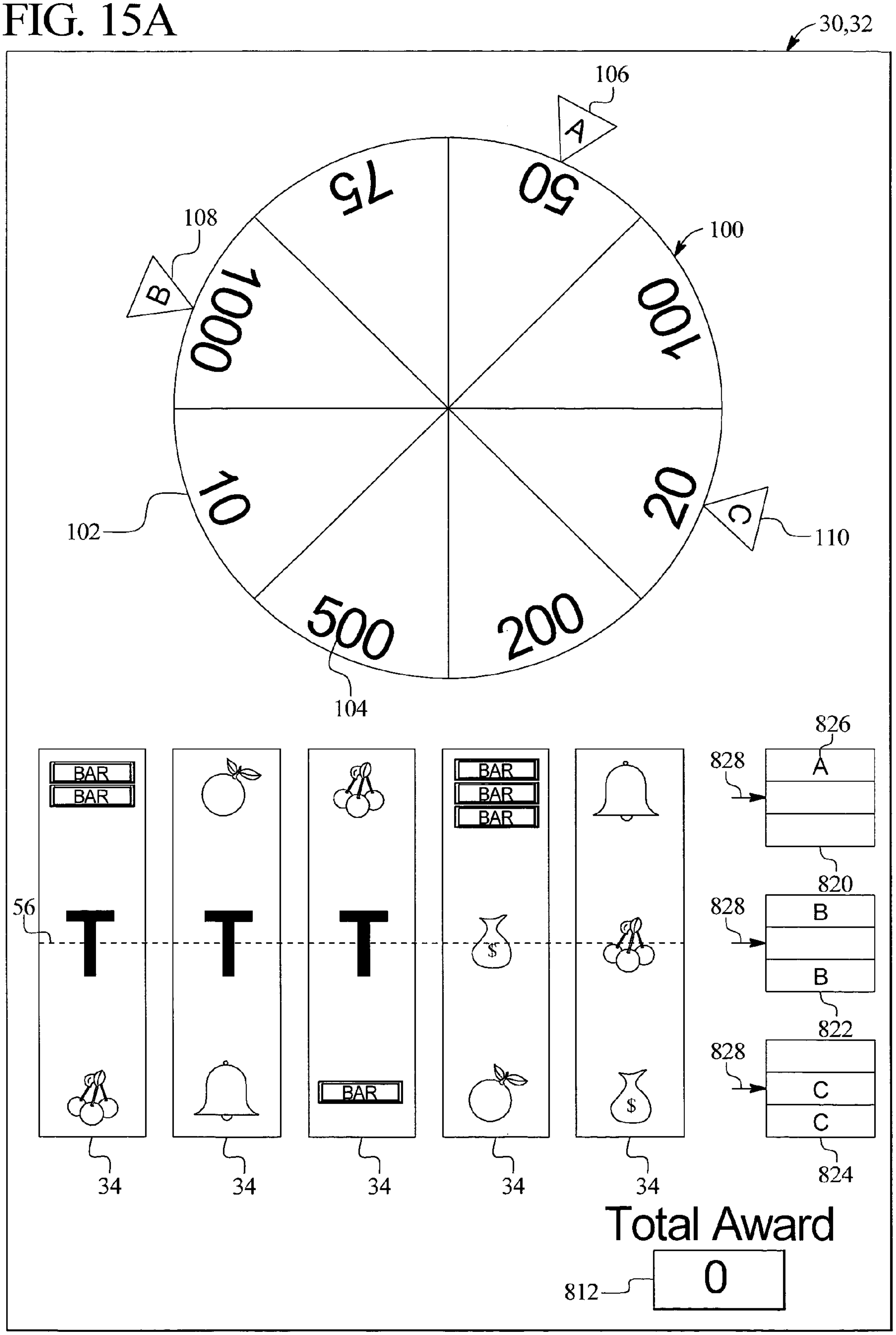
FIGS. 15A, 15B and 15C are front elevation views of another embodiment of the present invention illustrating a plurality of supplemental reels operable to generate a plurality of section indicator symbols.
Figure 15B:
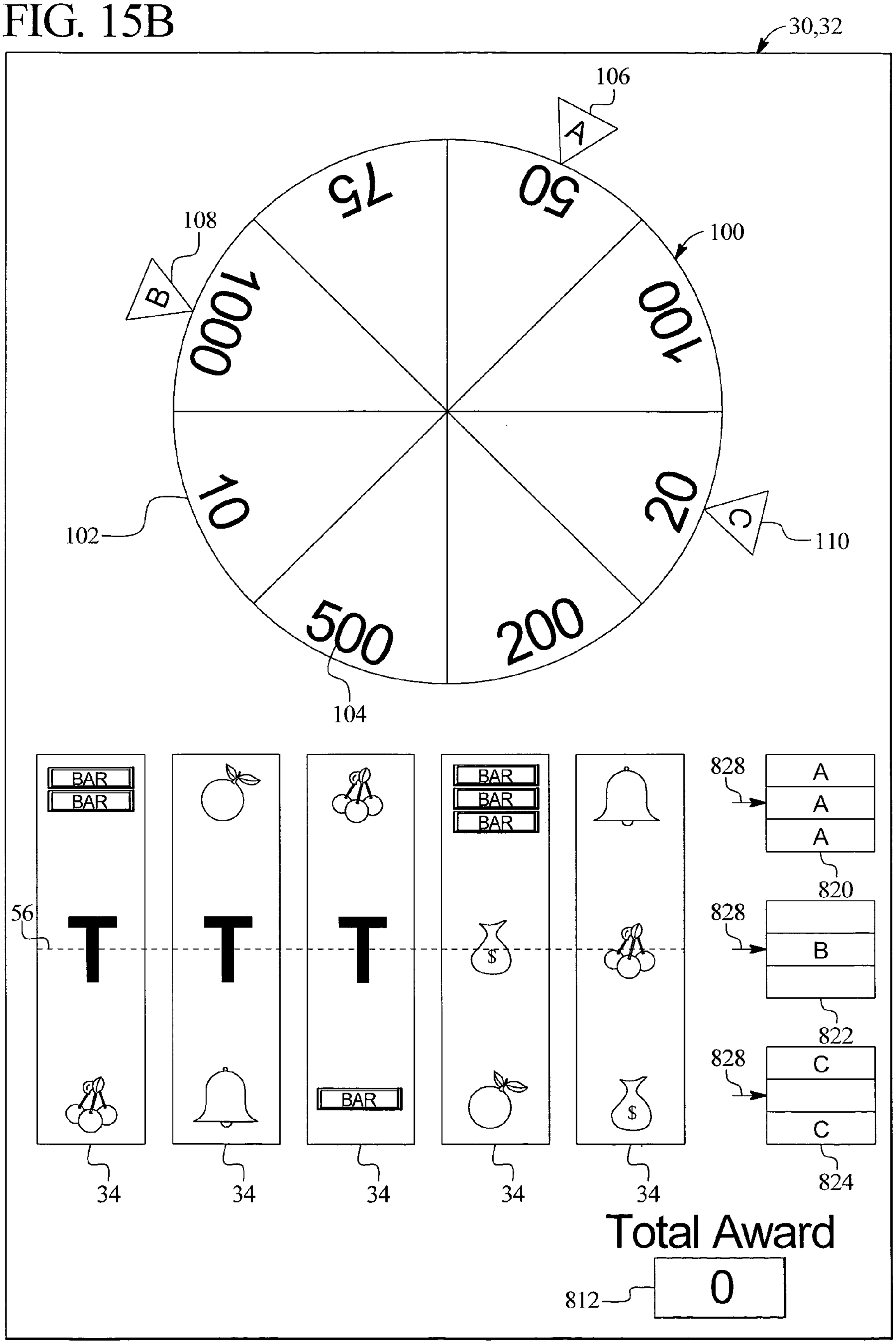
Figure 15C:
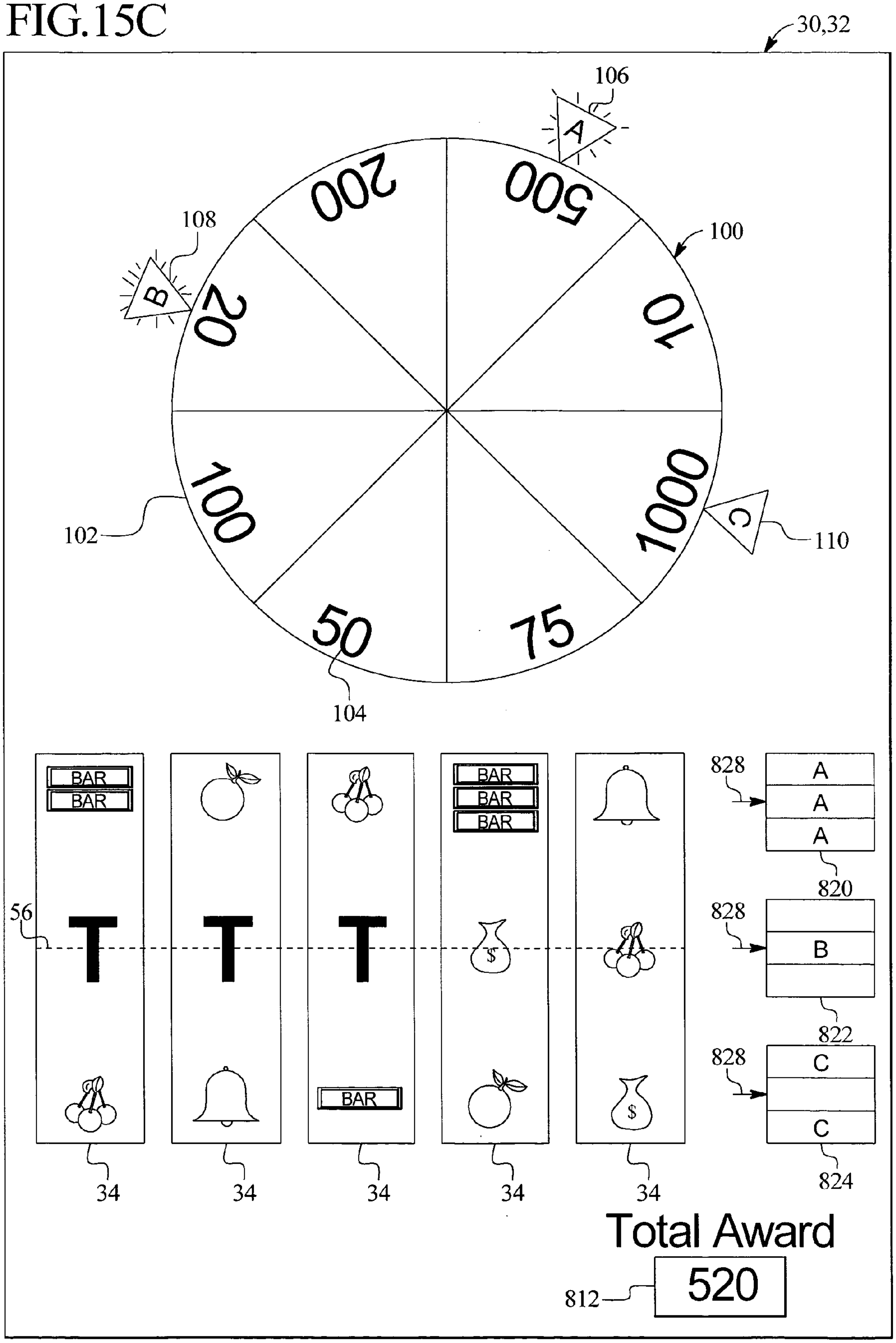

Referring to FIGS. 15A to 15C, in another embodiment of the present invention, in addition to the award generator or wheel 100 and the plurality of primary reels 34 as described above, the gaming device includes a plurality of award indicator activator symbol generators, such as independent supplemental reels, in mechanical or video form. In one embodiment, each of the independent supplemental reels is associated with one of the award or section indicators. For example, independent supplemental reel 820 is associated with section indicator 106, independent supplemental reel 822 is associated with section indicator 108 and independent supplemental reel 824 is associated with section indicator 110.

Each award indicator activator symbol generator is operable to generate an award indicator activator symbol which is associated with one of the award activators of the award or symbol generator. In this example, each different independent supplemental reel is operable to generate the section indicator activator symbol associated with the section indicator which relates to that independent supplemental reel. In other words, one supplemental reel will include one type of section indicator symbol which is associated with one section indicator while another supplemental reel will include another type of section indicator symbol which is associated with another type of section indicator. For example, supplemental reel 820 is operable to generate section indicator symbol 826 designated by the letter A which is associated with section indicator 106 also designated by the letter A. Each independent supplemental reel is also associated with an indicator or designator 828, such as a pointer, which indicates or points to one of the generated selection indicator symbols.

FIG. 15A illustrates one example of this embodiment after the primary reels have spun and a predetermined event or condition has occurred, in this case three "T" or triggering symbols generated on three adjacent reels. Accordingly, the gaming device activates each of the award indicator activator symbol generators (illustrated as independent supplemental reels). In other embodiments, the number and type of independent supplemental reels which are activated is predetermined, randomly determined, determined based on the player's wager, determined based on generated designated symbol combination or determined based on any other suitable manner.

As seen in FIG. 15B, after the predetermined condition occurs, the gaming device spins each of the activated independent supplemental reels to generate either a section indicator symbol or a non-award indicator activator symbol. For each activated independent supplemental reel which generates a section indicator symbol, the gaming device activates the section indicator associated with that generated section indicator symbol for one or more spins of the wheel or award generator. It should be appreciated that for each activated independent supplemental reel which generates a non-award indicator activator symbol (i.e., generates a blank symbol in this illustration), the gaming device does not activate any section indicator of the wheel or award generator.

For example, independent supplemental reel 820 generated a section indicator symbol, independent supplemental reel 822 generated a section indicator symbol and independent supplemental reel 824 did not generate a section indicator symbol. Accordingly, section indicators 106 and 108 which are associated with the two generated section indicator symbols will be activated for one or more spins of the wheel or award generator. Additionally, independent supplemental reel 824 generates a non-award indicator activator symbol and thus section indicator 110 which is associated with independent supplemental reel 824 is not activated for one or more spins of the wheel or award generator.

In one embodiment, if no independent supplemental reels generate a section indicator symbol, the gaming device reactivates one or more of the independent supplemental reels until at least one supplemental reel generates a section indicator symbol. In another embodiment, if no independent supplemental reels generate a section indicator symbol, the gaming device returns to the primary game and does not activate the wheel to spin.

As seen in FIG. 15C, after activating one or more of the section indicators, the gaming device activates the wheel to spin one or more times. The number of times the wheel spins may be predetermined, randomly determined, determined based on the player's wager or determined in any other suitable fashion. For each spin of the wheel, the award symbol indicated by each activated section indicator is provided to the player. In this case, activated indicator 106 indicates an award of five-hundred and activated indicator 108 indicates an award of twenty. A total award of five-hundred-twenty is determined and displayed to the player in a total award display 812. The total award is provided to the player and the game ends.

In one embodiment, the player is enabled to place a separate wager on one or more of the independent supplemental reels prior to the activation of any of the independent supplemental reels. In this embodiment, if the predetermined condition occurs and the gaming device selects to activate the supplemental reel which the player wagered on, the player is provided an award. In another embodiment, the player is enabled to place a separate wager on one or more of the independent supplemental reels prior to the activation of any of the supplemental reels. In this embodiment, if the independent supplemental reel which the player wagered on is activated and generates a section indicator symbol, the player is provided an award.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is claimed as follows:

1. A gaming device comprising:

at least one processor;

at least one input device;

at least one display device; and at least one memory device which stores a plurality of instructions, which when executed by the at least one processor, cause the at least one processor to operate with the at least one input device and the at least one display device to:

(a) enable a player to place a wager on a play of a primary game; and (b) after the placement of the wager and upon a random occurrence of a triggering event in the play of said primary game:

(i) cause a displayed award indicator activator symbol generator to randomly generate at least one of a plurality of award indicator activator symbols, wherein:

(A) each award indicator activator symbol is associated with at least one of a plurality of displayed award indicators associated with a displayed award generator, (B) for each award indicator activator symbol:

(I) which of the award indicators associated with said award indicator activator symbol are individually displayed in association with said award indicator activator symbol, and (II) the quantity of the award indicators associated with said award indicator activator symbol is displayed in association with said award indicator activator symbol, (C) the award generator is distinct from the award indicator activator symbol generator, and (D) at least one of said award indicator activator symbols is associated with a plurality of said award indicators;

(ii) activate, after the random generation of said at least one award indicator activator symbol, any award indicators associated with said generated award indicator activator symbol, said activation being distinct from the placement of the wager;

(iii) cause said award generator to randomly generate a plurality of awards;

(iv) for each activated award indicator, determine the generated award indicated by said activated award indicator;

(v) determine a total award associated with the award generator, said total award based on the generated award indicated by each activated award indicator; and (vi) display to the player the determined total award associated with the award generator.

2. The gaming device of claim 1, wherein said award indicator activator symbol generator is a reel and when executed by the at least one processor, the plurality of instructions cause the at least one processor to operate with the award indicator activator symbol generator.

3. The gaming device of claim 1, wherein said award generator is a wheel and when executed by the at least one processor, the plurality of instructions cause the at least one processor to operate with the award generator.

4. The gaming device of claim 1, wherein a plurality of said award indicator activator symbols are each associated with a plurality of said award indicators.

5. The gaming device of claim 1, wherein each of said award indicator activator symbols are associated with a plurality of said award indicators.

6. The gaming device of claim 1, wherein a plurality of said award indicator activator symbols are associated with each of said award indicators.

7. The gaming device of claim 1, wherein when executed by the at least one processor, the plurality of instructions cause the at least one processor to, cause said award indicator activator symbol generator to generate a plurality of said award indicator activator symbols upon the triggering event in the play of said primary game.

8. The gaming device of claim 1, which includes a plurality of award indicator activator symbol generators and when executed by the at least one processor, the plurality of instructions cause the at least one processor to operate with said award indicator activator symbol generators.

9. A gaming device comprising:

at least one processor;

at least one input device;

at least one award indicator activator symbol generator;

an award generator distinct from the at least one award indicator activator symbol generator;

at least one display device; and at least one memory device which stores a plurality of instructions, which when executed by the at least one processor, cause the at least one processor to operate with the at least one input device, the at least one award indicator activator symbol generator, the award generator and the at least one display device to:

(a) enable a player to place a wager on a play of a primary game; and (b) after the placement of the wager and upon a random occurrence of a triggering event:

(i) cause said at least one award indicator activator symbol generator to randomly generate at least one of a plurality of award indicator activator symbols, wherein:

(A) each award indicator activator symbol is associated with at least one of a plurality of displayed award indicators associated with said award generator, (B) for each award indicator activator symbol:

(I) which of the award indicators associated with said award indicator activator symbol are individually displayed in association with said award indicator activator symbol, and (II) the quantity of the award indicators associated with said award indicator activator symbol is displayed in association with said award indicator activator symbol, and (C) at least one of said award indicator activator symbols is associated with a plurality of said award indicators;

(ii) cause, after the random generation of said at least one award indicator activator symbol, the award generator to randomly generate a plurality of awards, said random generation being distinct from the placement of the wager;

(iii) for each of the award indicators associated with the generated award indicator activator symbols, determine the generated award indicated by said award indicator;

(iv) determine a total award associated with the award generator, said total award based on the generated awards indicated by the award indicators associated with the generated award indicator activator symbols; and (v) display to the player the determined total award associated with the award generator.

10. The gaming device of claim 9, wherein said award indicator activator symbol generator is a reel.

11. The gaming device of claim 9, wherein said award generator is a wheel.

12. The gaming device of claim 9, wherein a plurality of said award indicator activator symbols are each associated with a plurality of said award indicators.

13. The gaming device of claim 9, wherein each of said award indicator activator symbols are associated with a plurality of said award indicators.

14. The gaming device of claim 9, wherein a plurality of said award indicator activator symbols are associated with each of said award indicators.

15. The gaming device of claim 9, which includes a plurality of award indicator activator symbol generators.

16. A gaming device operated under control of a processor, said gaming device comprising:

at least one processor;

at least one input device;

at least one display device; and at least one memory device which stores a plurality of instructions, which when executed by the at least one processor, cause the at least one processor to operate with the at least one input device and the at least one display device to:

(a) enable a player to place a wager on a play of a primary game; and (b) after the placement of the wager and upon a random occurrence of a triggering event in said play of the primary game:

(i) cause at least one of a plurality of displayed award indicator activator symbol generators to randomly generate at least one of a plurality of award indicator activator symbols, each of said award indicator activator symbol generators configured to generate a different award indicator activator symbol, wherein:

(A) each different award indicator activator symbol is associated with one of a plurality of displayed award indicators associated with a displayed award generator, (B) for each award indicator activator symbol:

(I) which award indicator associated with said award indicator activator symbol is individually displayed in association with said award indicator activator symbol, and (II) the quantity of the award indicators associated with said award indicator activator symbol is displayed in association with said award indicator activator symbol, and (C) the award generator is distinct from each of the award indicator activator symbol generators;

(ii) activate, after the random generation of said at least one award indicator activator symbol, said award indicator associated with said generated award indicator activator symbol, said activation being distinct from the placement of the wager;

(iii) cause said award generator to randomly generate a plurality of awards;

(iv) for each activated award indicator, determine the generated award indicated by said activated award indicator;

(v) determine a total award associated with the award generator, said total award based on the generated award indicated by each activated award indicator; and (vi) display to the player the determined total award associated with the award generator.

17. The gaming device of claim 16, wherein each of said award indicator activator symbol generators is a reel and when executed by the at least one processor, the plurality of instructions cause the at least one processor to operate with each of the award indicator activator symbol generators.

18. The gaming device of claim 16, wherein said award generator is a wheel and when executed by the at least one processor, the plurality of instructions cause the at least one processor to operate with the award generator.

19. The gaming device of claim 16, wherein when executed by the at least one processor, the plurality of instructions cause the at least one processor to cause a plurality of said award indicator activator symbol generators to each generate at least one of said award indicator activator symbols upon the triggering event in said play of the primary game.

20. The gaming device of claim 16, wherein when executed by the at least one processor, the plurality of instructions cause the at least one processor to cause each of said award indicator activator symbol generators to generate at least one of said award indicator activator symbols upon the triggering event in said play of the primary game.

21. A method of operating a gaming device, said method comprising:

(a) after a random occurrence of a triggering event in a play of a primary game, randomly generating at least one of a plurality of award indicator activator symbols, wherein:
  (i) each award indicator activator symbol is associated with at least one of a plurality of displayed award indicators,
  (ii) for each award indicator activator symbol:
    (A) which of the award indicators associated with said award indicator activator symbol are individually displayed in association with said award indicator activator symbol, and
    (B) the quantity of the award indicators associated with said award indicator activator symbol is displayed in association with said award indicator activator symbol, and
  (iii) at least one of said award indicator activator symbols is associated with a plurality of said award indicators;
(b) activating, after the random generation of said at least one award indicator activator symbol, the award indicators associated with said generated award indicator activator symbol, said activation being distinct from the placement of the wager;
(c) distinct from the generation of the plurality of award indicator activator symbols, randomly generating a plurality of awards;
(d) causing a display device to display the generated plurality of awards;
(e) for each activated award indicator, determining the generated award indicated by said activated award indicator;
(f) determining a total award associated with the generated plurality of awards, said total award based on the generated award indicated by each activated award indicator; and
(g) causing the display device to display to the player the determined total award associated with the generated plurality of awards.

22. The method of claim 21, wherein a plurality of said award indicator activator symbols are each associated with a plurality of said award indicators.

23. The method of claim 21, wherein each of said award indicator activator symbols are associated with a plurality of said award indicators.

24. The method of claim 21, wherein a plurality of said award indicator activator symbols are associated with each of said award indicators.

25. The method of claim 21, which includes generating a plurality of said award indicator activator symbols.

26. The method of claim 21, which is provided to the player through a data network.

27. The method of claim 26, wherein the data network is an internet.

28. A method of operating a gaming device, said method comprising:

(a) after a random occurrence of a triggering event in a play of a primary game, causing at least one of a plurality of displayed award indicator activator symbol generators to randomly generate at least one of a plurality of award indicator activator symbols, wherein:
  (i) each of said award indicator activator symbol generators is associated with a different award indicator activator symbol,
  (ii) each different award indicator activator symbol is associated with one of a plurality of displayed award indicators,
  (iii) for each award indicator activator symbol:
    (A) which award indicator associated with said award indicator activator symbol is individually displayed in association with said award indicator activator symbol, and
    (B) the quantity of the award indicators associated with said award indicator activator symbol is displayed in association with said award indicator activator symbol,
  (iv) each of said award indicators is associated with a displayed award generator which includes a plurality of award symbols,
  (v) the award generator is distinct from each of said award indicator activator symbol generators, and
  (vi) each of said award symbols is associated with one of a plurality of awards;
(b) activating, after the random generation of said at least one award indicator activator symbol, said award indicator associated with any generated award indicator activator symbol, said activation being distinct from the placement of the wager;
(c) causing said award generator to randomly generate a plurality of said award symbols;
(d) causing a display device to display the generated plurality of said award symbols;
(e) determining any generated award symbols indicated by said activated award indicators;
(f) determining a total award associated with the award generator, said total award based on the generated award symbols indicated by said activated award indicators; and
(g) displaying to the player the determined total award associated with the award generator.

29. The method of claim 28, which includes causing a plurality of said award indicator activator symbol generators to each generate at least one of said award indicator activator symbols.

30. The method of claim 28, which includes causing each of said award indicator activator symbol generators to generate at least one of said award indicator activator symbols.

31. The method of claim 28, which is provided to the player through a data network.

32. The method of claim 31, wherein the data network is an internet.

33. A gaming system comprising:

at least one processor;
at least one input device;
at least one display device; and
at least one memory device which stores a plurality of instructions, which when executed by the at least one processor, cause the at least one processor to operate with the at least one display device and the at least one input device to:
(a) enable a player to play a primary game upon a wager by a player, said play of the primary game including a displayed award indicator activator symbol generator randomly generating at least one of a plurality of award indicator activator symbols, said award indicator activator symbol generator including said plurality of award indicator activator symbols, wherein:

each award indicator activator symbol is associated with at least one of a plurality of displayed award indicators associated with a displayed award generator, (ii) for each award indicator activator symbol:

(A) which of the award indicators associated with said award indicator activator symbol are individually displayed in association with said award indicator activator symbol, and (B) the quantity of the award indicators associated with said award indicator activator symbol is displayed in association with said award indicator activator symbol, (iii) the award generator is distinct from the award indicator activator symbol generator, and (iv) at least one of said award indicator activator symbols is associated with a plurality of said award indicators; and (b) after the placement of the wager and upon a random occurrence of a triggering event in said play of the primary game, display a play of a secondary game by:

(i) activating any award indicators associated with said generated award indicator activator symbol, said activation occurring after the random generation of said at least one award indicator activator symbol and being distinct from the placement of the wager, (ii) causing said award generator to randomly generate a plurality of awards, (iii) for each activated award indicator, determining the generated award indicated by said activated award indicator;

(iv) determining a total award associated with the award generator, said total award based on the generated award indicated by each activated award indicator; and (v) displaying to the player the determined total award associated with the award generator.

34. The gaming system of claim 33, wherein said award indicator activator symbol generator is selected from the group consisting of a reel and a wheel.

35. The gaming system of claim 33, wherein a plurality of said award indicator activator symbols are each associated with a plurality of said award indicators.

36. The gaming system of claim 33, wherein each of said award indicator activator symbols are associated with a plurality of said award indicators.

37. The gaming system of claim 33, wherein a plurality of said award indicator activator symbols are associated with each of said award indicators.

38. The gaming system of claim 33, wherein when executed by the at least one processor, said plurality of instructions cause the at least one processor to generate a plurality of said award indicator activator symbols for the play of the primary game.

39. The gaming system of claim 33, which includes a plurality of award indicator activator symbol generators.

* * * * *

UNITED STATES PATENT AND TRADEMARK OFFICE

CERTIFICATE OF CORRECTION

PATENT NO. : 7,794,317 B2
APPLICATION NO. : 10/956769
DATED : September 14, 2010
INVENTOR(S) : Kaminkow et al.

It is certified that error appears in the above-identified patent and that said Letters Patent is hereby corrected as shown below:

Claim 33, Column 34, Line 64, replace "a player, said play" with --the player, said play--.

Claim 33, Column 35, Line 3, before "each" insert --(i)--.

Claim 33, Column 36, Line 3, replace ";" with --,--.

Claim 33, Column 36, Line 6, replace ";" with --,--.

Signed and Sealed this

Thirtieth Day of November, 2010

David J. Kappos
*Director of the United States Patent and Trademark Office*